(12) United States Patent
Kozu et al.

(10) Patent No.: US 10,203,523 B2
(45) Date of Patent: Feb. 12, 2019

(54) PROGRESSIVE POWER LENS

(71) Applicant: HOYA LENS THAILAND LTD., Thanyaburi, Patumthani (TH)

(72) Inventors: Kazuma Kozu, Tokyo (JP); Takao Tanaka, Tokyo (JP)

(73) Assignee: HOYA LENS THAILAND LTD., Patumthani (TH)

( * ) Notice: Subject to any disclaimer, the term of this patent is extended or adjusted under 35 U.S.C. 154(b) by 18 days.

(21) Appl. No.: 15/518,158

(22) PCT Filed: Oct. 9, 2015

(86) PCT No.: PCT/JP2015/078753
§ 371 (c)(1),
(2) Date: Apr. 10, 2017

(87) PCT Pub. No.: WO2016/056649
PCT Pub. Date: Apr. 14, 2016

(65) Prior Publication Data
US 2017/0293159 A1 Oct. 12, 2017

(30) Foreign Application Priority Data
Oct. 10, 2014 (JP) .................................. 2014-209351

(51) Int. Cl.
*G02C 7/06* (2006.01)

(52) U.S. Cl.
CPC ............... *G02C 7/063* (2013.01); *G02C 7/06* (2013.01); *G02C 7/068* (2013.01); *G02C 2202/16* (2013.01)

(58) Field of Classification Search
CPC .......... G02C 7/041; G02C 7/06; G02C 7/061; G02C 7/063; G02C 7/066; G02C 7/068
(Continued)

(56) References Cited

U.S. PATENT DOCUMENTS

2004/0233385 A1 11/2004 Kitani et al.
2005/0099596 A1 5/2005 Kato
(Continued)

FOREIGN PATENT DOCUMENTS

DE 10 2008 022010 A1 11/2009
EP 1 906 227 A1 4/2008
(Continued)

OTHER PUBLICATIONS

Apr. 11, 2017 International Preliminary Report on Patentability issued in International Patent Application No. PCT/JP2015/078753.
(Continued)

*Primary Examiner* — Darryl J Collins
(74) *Attorney, Agent, or Firm* — Oliff PLC

(57) ABSTRACT

Progressive power lens including: object side surface; eyeball side surface; and at least a near portion having a power for near vision, wherein object side surface includes power change in vertical direction of lens having progressive refractive power function, eyeball side surface includes power change in horizontal direction of lens having progressive refractive power function, when surface refractive power in the horizontal direction is defined as DHn and surface refractive power in vertical direction is defined as DVn in near power measurement point N in object side surface, relational expression of DHn<DVn is fulfilled, and near portion of eyeball side surface has a shaped part wherein signs of positive and negative of surface refractive power in vertical direction of lens and surface refractive power in horizontal direction of lens are opposite to each other.

6 Claims, 18 Drawing Sheets

(58) Field of Classification Search
USPC .......... 351/159.06, 159.42, 159.46, 159.47
See application file for complete search history.

(56) References Cited

U.S. PATENT DOCUMENTS

| | | |
|---|---|---|
| 2005/0179861 A1 | 8/2005 | Kitani et al. |
| 2008/0218689 A1 | 9/2008 | Blum et al. |
| 2009/0108477 A1 | 4/2009 | Yamakaji et al. |
| 2010/0134755 A1 | 6/2010 | Kaga et al. |
| 2010/0290001 A1 | 11/2010 | Kaga et al. |
| 2012/0200822 A1 | 8/2012 | Kaga et al. |
| 2013/0083288 A1 | 4/2013 | Shinohara et al. |
| 2015/0055083 A1 | 2/2015 | Mori et al. |

FOREIGN PATENT DOCUMENTS

| | | |
|---|---|---|
| JP | H06-118353 A | 4/1994 |
| JP | 2003-344813 A | 12/2003 |
| JP | 2005-084595 A | 3/2005 |
| JP | 2007-086740 A | 4/2007 |
| JP | 2010-097205 A | 4/2010 |
| JP | 2013-076850 A | 4/2013 |
| JP | 2013-218004 A | 10/2013 |
| WO | 2007/0058353 A1 | 5/2007 |

OTHER PUBLICATIONS

Dec. 22, 2015 Search Report issued in International Patent Application No. PCT/JP2015/078753.
May 14, 2018 Extended Search Report issued in European Patent Application No. 15848562.3.

FIG. 1A
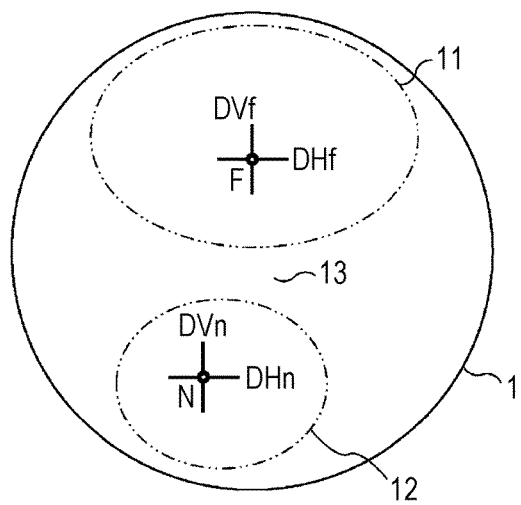
F: DISTANCE POWER MEASUREMENT POINT
N: NEAR POWER MEASUREMENT POINT
FIG. 1B
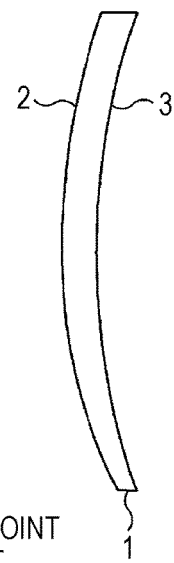
FIG. 2
|  | OBJECT SIDE | | EYEBALL SIDE | |
|---|---|---|---|---|
|  | VERTICAL ADDITION | HORIZONTAL ADDITION | VERTICAL ADDITION | HORIZONTAL ADDITION |
| OUTER SURFACE | 100 | 100 | 0 | 0 |
| INNER SURFACE | 0 | 0 | 100 | 100 |
| BOTH-SIDES 1 | 50 | 50 | 50 | 50 |
| BOTH-SIDES 2 | 30 | 30 | 70 | 70 |
| BOTH-SIDES COMPOSITE 1 | 100 | 0 | 0 | 100 |
| BOTH-SIDES COMPOSITE 2 | 100 | 25 | 0 | 75 |
| BOTH-SIDES COMPOSITE 3 | 150 | 0 | −50 | 100 |
(%)

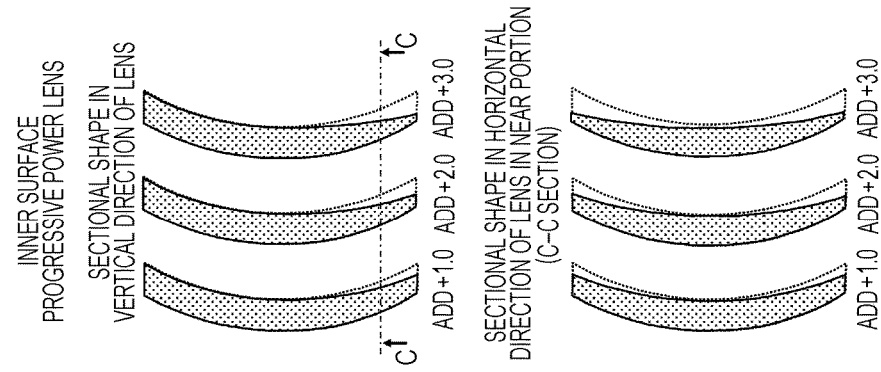
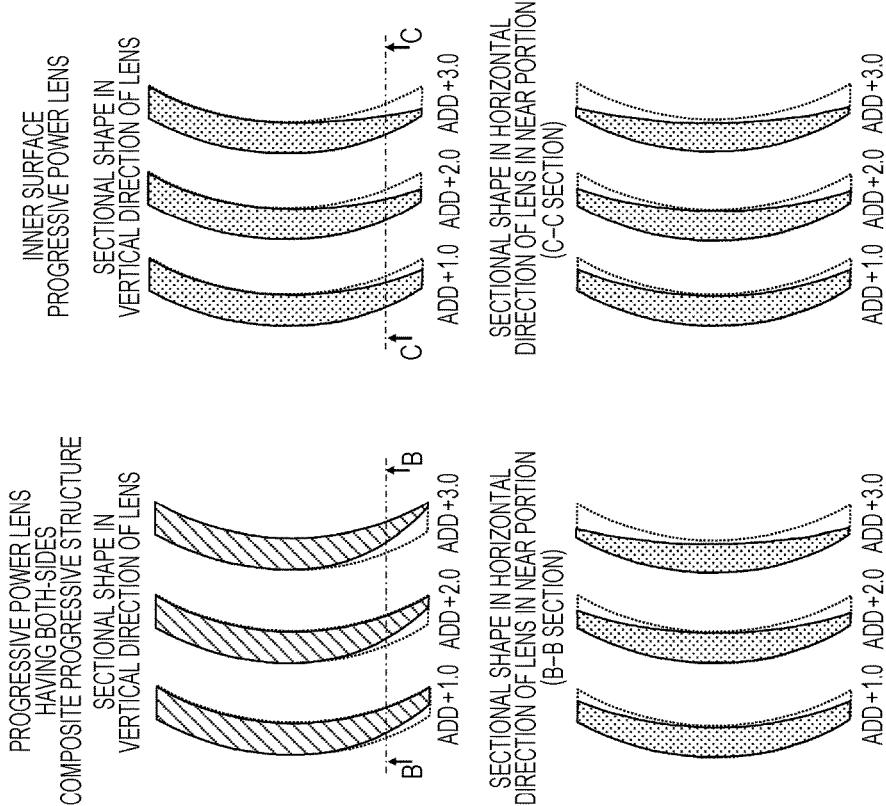
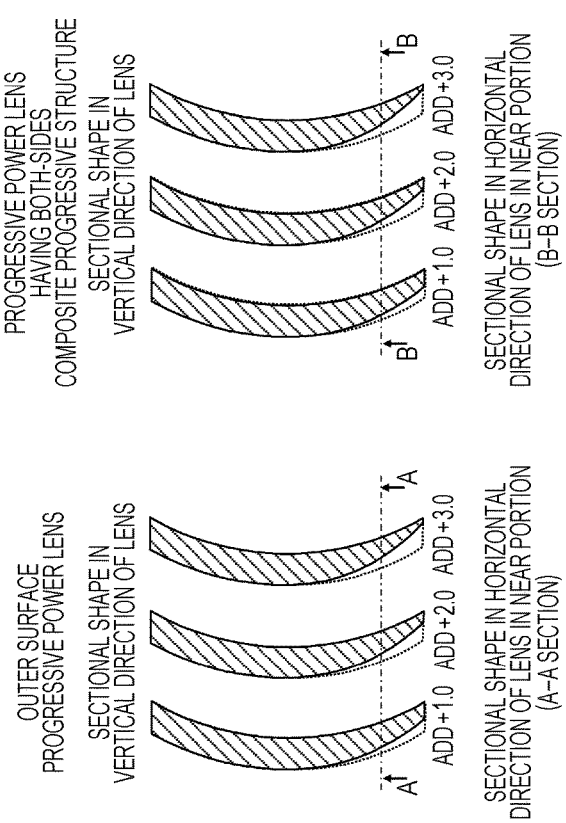

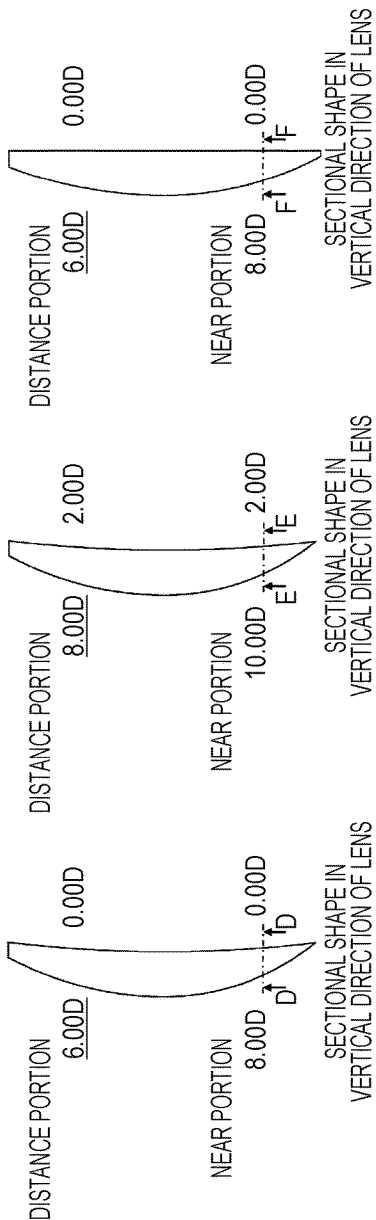
FIG. 5A — PROGRESSIVE POWER LENS HAVING BOTH-SIDES COMPOSITE PROGRESSIVE STRUCTURE ACCORDING TO THE PRESENT EMBODIMENT
FIG. 5B — PROGRESSIVE POWER LENS HAVING BOTH-SIDES COMPOSITE PROGRESSIVE STRUCTURE ACCORDING TO CONVENTIONAL ONE
FIG. 5C — OUTER SURFACE PROGRESSIVE POWER LENS

F DISTANCE POWER MEASUREMENT POINT
N NEAR POWER MEASUREMENT POINT

DESIGN CONDITION OF EXAMPLES

| | XF | YF | XN | YN | S POWER (D) | C POWER (D) | AX (DEGREE) | ADDITION POWER (D) | THICKNESS (mm) |
|---|---|---|---|---|---|---|---|---|---|
| COMPARATIVE EXAMPLE 1 | 0 | 8 | -3.4 | -14 | 6.00 | 0.00 | 0 | 2.50 | 6.0 |
| COMPARATIVE EXAMPLE 2 | 0 | 8 | -3.4 | -14 | 6.00 | 0.00 | 0 | 2.50 | 6.0 |
| EXAMPLE 1 | 0 | 8 | -3.4 | -14 | 6.00 | 0.00 | 0 | 2.50 | 6.0 |
| EXAMPLE 2 | 0 | 8 | -3.4 | -14 | 6.00 | 0.00 | 0 | 2.50 | 6.0 |
| EXAMPLE 3 | 0 | 8 | -3.2 | -14 | 6.00 | -2.00 | 90 | 2.50 | 6.0 |

FIG. 8

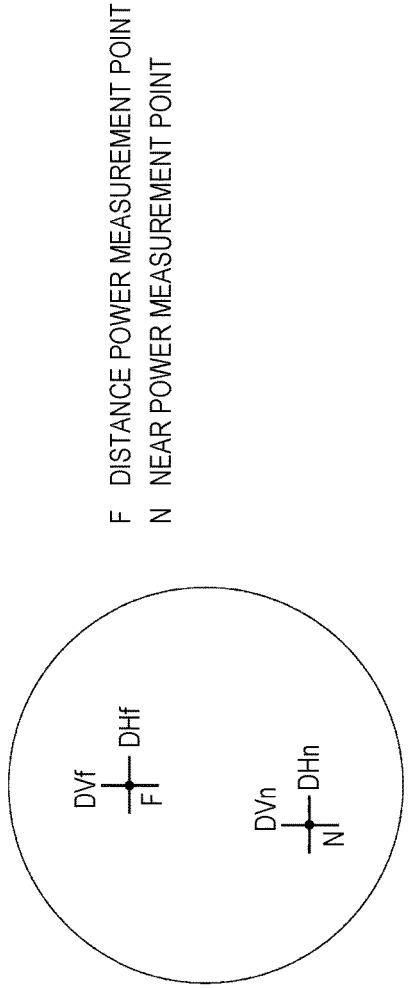

F  DISTANCE POWER MEASUREMENT POINT
N  NEAR POWER MEASUREMENT POINT

| | ASPHERICAL SURFACE CORRECTION | DVf1 | DHf1 | DVn1 | DHn1 | DVf2 | DHf2 | DVn2 | DHn2 |
|---|---|---|---|---|---|---|---|---|---|
| COMPARATIVE EXAMPLE 1 | NOT APPLIED | 9.00 | 9.00 | 12.02 | 9.00 | 3.38 | 3.37 | 3.87 | 0.53 |
| COMPARATIVE EXAMPLE 2 | APPLIED | 9.00 | 9.00 | 12.02 | 9.00 | 3.44 | 3.34 | 3.91 | 0.51 |
| EXAMPLE 1 | NOT APPLIED | 7.00 | 7.00 | 10.03 | 7.00 | 1.25 | 1.25 | 1.79 | −1.54 |
| EXAMPLE 2 | APPLIED | 7.00 | 7.00 | 10.03 | 7.00 | 1.49 | 1.28 | 2.15 | −1.41 |
| EXAMPLE 3 (BEFORE COMPONENT OF ASTIGMATISM IN CONCAVE SURFACE IS REMOVED) | APPLIED | 7.00 | 7.00 | 10.03 | 7.00 | 1.48 | 3.21 | 2.13 | 0.42 |
| EXAMPLE 3 (AFTER COMPONENT OF ASTIGMATISM IN CONCAVE SURFACE IS REMOVED) | APPLIED | 7.00 | 7.00 | 10.03 | 7.00 | 1.49 | 1.21 | 2.15 | −1.58 |

SURFACE REFRACTIVE POWER IN VERTICAL DIRECTION OF LENS INNER SURFACE SIDE NEAR PORTION (DV)

| Y\X | -10 | -9 | -8 | -7 | -6 | -5 | -4 | -3 | -2 | -1 | 0 | 1 | 2 | 3 | 4 |
|---|---|---|---|---|---|---|---|---|---|---|---|---|---|---|---|
| -4 | 1.51 | 1.53 | 1.56 | 1.58 | 1.61 | 1.62 | 1.62 | 1.59 | 1.54 | 1.48 | 1.43 | 1.40 | 1.40 | 1.40 | 1.41 |
| -5 | 1.66 | 1.67 | 1.69 | 1.70 | 1.71 | 1.71 | 1.69 | 1.64 | 1.58 | 1.52 | 1.48 | 1.46 | 1.47 | 1.49 | 1.51 |
| -6 | 1.79 | 1.79 | 1.79 | 1.79 | 1.79 | 1.77 | 1.72 | 1.66 | 1.60 | 1.56 | 1.53 | 1.53 | 1.55 | 1.58 | 1.61 |
| -7 | 1.92 | 1.91 | 1.90 | 1.88 | 1.85 | 1.80 | 1.74 | 1.68 | 1.64 | 1.61 | 1.60 | 1.61 | 1.64 | 1.68 | 1.71 |
| -8 | 2.06 | 2.04 | 2.01 | 1.96 | 1.90 | 1.82 | 1.75 | 1.70 | 1.67 | 1.66 | 1.67 | 1.69 | 1.73 | 1.77 | 1.81 |
| -9 | 2.18 | 2.14 | 2.09 | 2.02 | 1.93 | 1.84 | 1.77 | 1.73 | 1.71 | 1.71 | 1.73 | 1.77 | 1.81 | 1.85 | 1.89 |
| -10 | 2.25 | 2.20 | 2.12 | 2.03 | 1.94 | 1.85 | 1.79 | 1.75 | 1.74 | 1.76 | 1.79 | 1.83 | 1.88 | 1.92 | 1.96 |
| -11 | 2.28 | 2.20 | 2.12 | 2.02 | 1.94 | 1.86 | 1.80 | 1.77 | 1.77 | 1.79 | 1.84 | 1.88 | 1.93 | 1.97 | 2.02 |
| -12 | 2.26 | 2.18 | 2.10 | 2.01 | 1.93 | 1.86 | 1.81 | 1.78 | 1.79 | 1.82 | 1.87 | 1.92 | 1.96 | 2.01 | 2.05 |
| -13 | 2.23 | 2.15 | 2.08 | 2.00 | 1.93 | 1.86 | 1.81 | 1.79 | 1.80 | 1.84 | 1.89 | 1.93 | 1.98 | 2.02 | 2.07 |
| -14 | 2.19 | 2.12 | 2.05 | 1.98 | 1.91 | 1.85 | 1.80 | 1.79 | 1.80 | 1.84 | 1.89 | 1.93 | 1.98 | 2.02 | 2.06 |
| -15 | 2.14 | 2.07 | 2.01 | 1.95 | 1.88 | 1.83 | 1.79 | 1.79 | 1.80 | 1.84 | 1.88 | 1.92 | 1.96 | 2.00 | 2.04 |
| -16 | 2.08 | 2.02 | 1.96 | 1.90 | 1.85 | 1.81 | 1.79 | 1.78 | 1.79 | 1.83 | 1.86 | 1.89 | 1.93 | 1.97 | 2.01 |
| -17 | 2.02 | 1.97 | 1.91 | 1.86 | 1.82 | 1.79 | 1.78 | 1.78 | 1.79 | 1.81 | 1.84 | 1.86 | 1.90 | 1.93 | 1.97 |
| -18 | 1.97 | 1.92 | 1.87 | 1.83 | 1.80 | 1.78 | 1.78 | 1.78 | 1.78 | 1.80 | 1.81 | 1.84 | 1.87 | 1.90 | 1.93 |
| -19 | 1.93 | 1.88 | 1.84 | 1.81 | 1.79 | 1.78 | 1.78 | 1.78 | 1.78 | 1.79 | 1.80 | 1.81 | 1.84 | 1.87 | 1.91 |
| -20 | 1.90 | 1.85 | 1.82 | 1.79 | 1.78 | 1.77 | 1.78 | 1.78 | 1.77 | 1.77 | 1.78 | 1.80 | 1.82 | 1.85 | 1.88 |
| -21 | 1.87 | 1.83 | 1.80 | 1.78 | 1.77 | 1.77 | 1.77 | 1.77 | 1.76 | 1.76 | 1.77 | 1.78 | 1.80 | 1.83 | 1.86 |
| -22 | 1.86 | 1.82 | 1.79 | 1.77 | 1.76 | 1.76 | 1.76 | 1.76 | 1.75 | 1.75 | 1.76 | 1.77 | 1.78 | 1.81 | 1.83 |
| -23 | 1.84 | 1.80 | 1.78 | 1.76 | 1.75 | 1.75 | 1.75 | 1.75 | 1.74 | 1.74 | 1.74 | 1.75 | 1.76 | 1.78 | 1.81 |
| -24 | 1.82 | 1.79 | 1.77 | 1.75 | 1.74 | 1.74 | 1.74 | 1.74 | 1.73 | 1.73 | 1.73 | 1.74 | 1.75 | 1.76 | 1.78 |

SURFACE REFRACTIVE POWER IN HORIZONTAL DIRECTION OF LENS INNER SURFACE SIDE NEAR PORTION (DH)

| Y \ X | -10 | -9 | -8 | -7 | -6 | -5 | -4 | -3 | -2 | -1 | 0 | 1 | 2 | 3 | 4 |
|---|---|---|---|---|---|---|---|---|---|---|---|---|---|---|---|
| -4 | 0.71 | 0.65 | 0.59 | 0.52 | 0.42 | 0.28 | 0.12 | 0.01 | -0.04 | -0.06 | -0.01 | 0.11 | 0.26 | 0.39 | 0.48 |
| -5 | 0.70 | 0.64 | 0.58 | 0.49 | 0.36 | 0.16 | -0.05 | -0.20 | -0.26 | -0.25 | -0.16 | -0.01 | 0.18 | 0.34 | 0.46 |
| -6 | 0.69 | 0.62 | 0.56 | 0.46 | 0.28 | 0.02 | -0.25 | -0.42 | -0.47 | -0.42 | -0.29 | -0.10 | 0.11 | 0.30 | 0.43 |
| -7 | 0.68 | 0.62 | 0.55 | 0.42 | 0.19 | -0.14 | -0.46 | -0.64 | -0.67 | -0.57 | -0.39 | -0.17 | 0.06 | 0.25 | 0.39 |
| -8 | 0.67 | 0.61 | 0.53 | 0.37 | 0.07 | -0.32 | -0.66 | -0.85 | -0.86 | -0.70 | -0.47 | -0.23 | 0.01 | 0.20 | 0.35 |
| -9 | 0.66 | 0.59 | 0.49 | 0.29 | -0.06 | -0.48 | -0.85 | -1.04 | -1.03 | -0.81 | -0.53 | -0.27 | -0.04 | 0.15 | 0.30 |
| -10 | 0.63 | 0.56 | 0.44 | 0.20 | -0.18 | -0.63 | -1.01 | -1.21 | -1.17 | -0.90 | -0.58 | -0.31 | -0.09 | 0.10 | 0.25 |
| -11 | 0.60 | 0.51 | 0.37 | 0.10 | -0.29 | -0.76 | -1.15 | -1.35 | -1.27 | -0.97 | -0.62 | -0.34 | -0.13 | 0.04 | 0.20 |
| -12 | 0.56 | 0.45 | 0.29 | 0.01 | -0.40 | -0.87 | -1.27 | -1.46 | -1.35 | -1.03 | -0.66 | -0.38 | -0.18 | -0.01 | 0.14 |
| -13 | 0.52 | 0.39 | 0.21 | -0.08 | -0.49 | -0.96 | -1.36 | -1.53 | -1.40 | -1.07 | -0.71 | -0.43 | -0.22 | -0.06 | 0.10 |
| -14 | 0.47 | 0.33 | 0.13 | -0.17 | -0.59 | -1.04 | -1.41 | -1.56 | -1.42 | -1.10 | -0.75 | -0.47 | -0.27 | -0.11 | 0.05 |
| -15 | 0.42 | 0.26 | 0.05 | -0.26 | -0.67 | -1.10 | -1.44 | -1.56 | -1.42 | -1.13 | -0.80 | -0.53 | -0.32 | -0.15 | 0.02 |
| -16 | 0.37 | 0.20 | -0.03 | -0.35 | -0.75 | -1.14 | -1.42 | -1.54 | -1.41 | -1.15 | -0.84 | -0.58 | -0.37 | -0.18 | -0.02 |
| -17 | 0.32 | 0.13 | -0.11 | -0.43 | -0.81 | -1.16 | -1.42 | -1.50 | -1.39 | -1.16 | -0.88 | -0.63 | -0.41 | -0.22 | -0.05 |
| -18 | 0.26 | 0.07 | -0.19 | -0.51 | -0.85 | -1.17 | -1.39 | -1.45 | -1.36 | -1.16 | -0.91 | -0.68 | -0.46 | -0.26 | -0.08 |
| -19 | 0.21 | -0.01 | -0.27 | -0.57 | -0.88 | -1.16 | -1.35 | -1.40 | -1.32 | -1.16 | -0.94 | -0.72 | -0.50 | -0.29 | -0.11 |
| -20 | 0.15 | -0.07 | -0.33 | -0.62 | -0.90 | -1.15 | -1.30 | -1.35 | -1.29 | -1.15 | -0.96 | -0.75 | -0.53 | -0.33 | -0.14 |
| -21 | 0.09 | -0.13 | -0.38 | -0.65 | -0.91 | -1.12 | -1.26 | -1.30 | -1.25 | -1.13 | -0.97 | -0.77 | -0.56 | -0.36 | -0.17 |
| -22 | 0.04 | -0.18 | -0.43 | -0.68 | -0.91 | -1.10 | -1.21 | -1.25 | -1.21 | -1.11 | -0.96 | -0.78 | -0.58 | -0.38 | -0.20 |
| -23 | -0.01 | -0.23 | -0.46 | -0.69 | -0.90 | -1.07 | -1.17 | -1.21 | -1.18 | -1.09 | -0.96 | -0.79 | -0.60 | -0.41 | -0.22 |
| -24 | -0.05 | -0.26 | -0.48 | -0.70 | -0.89 | -1.04 | -1.13 | -1.16 | -1.14 | -1.06 | -0.94 | -0.79 | -0.61 | -0.43 | -0.24 |

EXAMPLE 1

COMPARATIVE EXAMPLE 1

SURFACE REFRACTIVE POWER IN VERTICAL DIRECTION OF LENS INNER SURFACE SIDE NEAR PORTION (DV)

| Y\X | -10 | -9 | -8 | -7 | -6 | -5 | -4 | -3 | -2 | -1 | 0 | 1 | 2 | 3 | 4 |
|---|---|---|---|---|---|---|---|---|---|---|---|---|---|---|---|
| -4 | 1.62 | 1.61 | 1.62 | 1.62 | 1.62 | 1.62 | 1.60 | 1.56 | 1.50 | 1.43 | 1.37 | 1.34 | 1.35 | 1.36 | 1.38 |
| -5 | 1.79 | 1.78 | 1.78 | 1.77 | 1.76 | 1.74 | 1.70 | 1.64 | 1.55 | 1.48 | 1.43 | 1.42 | 1.44 | 1.48 | 1.52 |
| -6 | 1.95 | 1.93 | 1.91 | 1.90 | 1.87 | 1.83 | 1.77 | 1.68 | 1.60 | 1.54 | 1.51 | 1.52 | 1.55 | 1.60 | 1.64 |
| -7 | 2.11 | 2.08 | 2.05 | 2.01 | 1.97 | 1.90 | 1.81 | 1.73 | 1.67 | 1.63 | 1.62 | 1.63 | 1.67 | 1.73 | 1.78 |
| -8 | 2.27 | 2.23 | 2.19 | 2.13 | 2.05 | 1.95 | 1.86 | 1.79 | 1.75 | 1.72 | 1.73 | 1.76 | 1.81 | 1.86 | 1.92 |
| -9 | 2.42 | 2.37 | 2.30 | 2.22 | 2.11 | 2.00 | 1.92 | 1.86 | 1.83 | 1.82 | 1.85 | 1.88 | 1.93 | 1.99 | 2.04 |
| -10 | 2.52 | 2.45 | 2.36 | 2.26 | 2.15 | 2.05 | 1.97 | 1.92 | 1.90 | 1.92 | 1.95 | 2.00 | 2.05 | 2.10 | 2.15 |
| -11 | 2.57 | 2.49 | 2.39 | 2.28 | 2.18 | 2.09 | 2.02 | 1.98 | 1.97 | 2.00 | 2.05 | 2.10 | 2.14 | 2.19 | 2.24 |
| -12 | 2.59 | 2.50 | 2.40 | 2.30 | 2.21 | 2.13 | 2.07 | 2.04 | 2.04 | 2.08 | 2.13 | 2.18 | 2.23 | 2.27 | 2.33 |
| -13 | 2.59 | 2.50 | 2.42 | 2.33 | 2.25 | 2.17 | 2.12 | 2.09 | 2.11 | 2.15 | 2.20 | 2.25 | 2.29 | 2.34 | 2.39 |
| -14 | 2.59 | 2.51 | 2.43 | 2.36 | 2.28 | 2.21 | 2.16 | 2.15 | 2.17 | 2.21 | 2.25 | 2.30 | 2.35 | 2.39 | 2.44 |
| -15 | 2.57 | 2.51 | 2.44 | 2.37 | 2.30 | 2.24 | 2.21 | 2.20 | 2.22 | 2.26 | 2.30 | 2.34 | 2.39 | 2.43 | 2.47 |
| -16 | 2.56 | 2.50 | 2.44 | 2.37 | 2.31 | 2.27 | 2.25 | 2.25 | 2.27 | 2.30 | 2.34 | 2.37 | 2.41 | 2.45 | 2.49 |
| -17 | 2.54 | 2.49 | 2.43 | 2.38 | 2.33 | 2.31 | 2.30 | 2.30 | 2.32 | 2.34 | 2.36 | 2.39 | 2.43 | 2.46 | 2.50 |
| -18 | 2.53 | 2.48 | 2.43 | 2.39 | 2.36 | 2.34 | 2.34 | 2.35 | 2.36 | 2.37 | 2.39 | 2.41 | 2.44 | 2.48 | 2.51 |
| -19 | 2.52 | 2.48 | 2.44 | 2.41 | 2.39 | 2.38 | 2.39 | 2.39 | 2.40 | 2.40 | 2.42 | 2.43 | 2.46 | 2.49 | 2.53 |
| -20 | 2.53 | 2.49 | 2.46 | 2.43 | 2.42 | 2.42 | 2.43 | 2.43 | 2.43 | 2.44 | 2.44 | 2.46 | 2.48 | 2.51 | 2.55 |
| -21 | 2.54 | 2.50 | 2.48 | 2.46 | 2.46 | 2.46 | 2.46 | 2.47 | 2.47 | 2.47 | 2.47 | 2.48 | 2.51 | 2.53 | 2.56 |
| -22 | 2.55 | 2.52 | 2.50 | 2.49 | 2.48 | 2.49 | 2.49 | 2.49 | 2.49 | 2.49 | 2.50 | 2.51 | 2.52 | 2.55 | 2.57 |
| -23 | 2.56 | 2.54 | 2.52 | 2.51 | 2.51 | 2.51 | 2.52 | 2.52 | 2.52 | 2.52 | 2.52 | 2.53 | 2.54 | 2.56 | 2.58 |
| -24 | 2.57 | 2.55 | 2.53 | 2.53 | 2.53 | 2.53 | 2.53 | 2.54 | 2.54 | 2.54 | 2.54 | 2.54 | 2.55 | 2.57 | 2.58 |

SURFACE REFRACTIVE POWER IN HORIZONTAL DIRECTION OF LENS INNER SURFACE SIDE NEAR PORTION (DH)

| Y\X | -10 | -9 | -8 | -7 | -6 | -5 | -4 | -3 | -2 | -1 | 0 | 1 | 2 | 4 |
|---|---|---|---|---|---|---|---|---|---|---|---|---|---|---|
| -4 | 1.11 | 0.97 | 0.84 | 0.69 | 0.52 | 0.32 | 0.11 | -0.05 | -0.15 | -0.21 | -0.17 | -0.04 | 0.16 | 0.49 |
| -5 | 1.11 | 0.97 | 0.84 | 0.68 | 0.47 | 0.21 | -0.05 | -0.25 | -0.36 | -0.40 | -0.33 | -0.15 | 0.09 | 0.48 |
| -6 | 1.11 | 0.97 | 0.84 | 0.67 | 0.42 | 0.09 | -0.23 | -0.47 | -0.58 | -0.57 | -0.44 | -0.23 | 0.03 | 0.47 |
| -7 | 1.11 | 0.98 | 0.84 | 0.65 | 0.34 | -0.05 | -0.43 | -0.68 | -0.77 | -0.71 | -0.53 | -0.29 | -0.01 | 0.46 |
| -8 | 1.11 | 0.99 | 0.84 | 0.61 | 0.25 | -0.21 | -0.63 | -0.88 | -0.94 | -0.81 | -0.58 | -0.31 | -0.04 | 0.43 |
| -9 | 1.12 | 0.99 | 0.83 | 0.56 | 0.13 | -0.37 | -0.80 | -1.06 | -1.09 | -0.89 | -0.61 | -0.33 | -0.05 | 0.41 |
| -10 | 1.11 | 0.97 | 0.79 | 0.48 | 0.02 | -0.50 | -0.95 | -1.21 | -1.20 | -0.95 | -0.62 | -0.33 | -0.07 | 0.38 |
| -11 | 1.09 | 0.94 | 0.73 | 0.39 | -0.08 | -0.61 | -1.07 | -1.32 | -1.28 | -0.99 | -0.63 | -0.33 | -0.08 | 0.35 |
| -12 | 1.07 | 0.89 | 0.66 | 0.32 | -0.16 | -0.70 | -1.17 | -1.41 | -1.32 | -1.01 | -0.63 | -0.33 | -0.09 | 0.33 |
| -13 | 1.04 | 0.85 | 0.60 | 0.24 | -0.24 | -0.78 | -1.23 | -1.45 | -1.34 | -1.01 | -0.63 | -0.33 | -0.10 | 0.31 |
| -14 | 1.00 | 0.80 | 0.54 | 0.17 | -0.31 | -0.83 | -1.26 | -1.45 | -1.32 | -1.01 | -0.64 | -0.34 | -0.11 | 0.30 |
| -15 | 0.97 | 0.75 | 0.48 | 0.10 | -0.37 | -0.87 | -1.26 | -1.41 | -1.29 | -0.99 | -0.65 | -0.35 | -0.12 | 0.29 |
| -16 | 0.93 | 0.71 | 0.42 | 0.04 | -0.42 | -0.88 | -1.23 | -1.35 | -1.24 | -0.97 | -0.65 | -0.37 | -0.13 | 0.29 |
| -17 | 0.89 | 0.66 | 0.35 | -0.03 | -0.46 | -0.87 | -1.17 | -1.27 | -1.17 | -0.94 | -0.65 | -0.39 | -0.14 | 0.29 |
| -18 | 0.85 | 0.60 | 0.29 | -0.08 | -0.48 | -0.85 | -1.10 | -1.19 | -1.11 | -0.91 | -0.65 | -0.39 | -0.15 | 0.29 |
| -19 | 0.81 | 0.55 | 0.24 | -0.12 | -0.48 | -0.81 | -1.03 | -1.10 | -1.03 | -0.87 | -0.64 | -0.40 | -0.16 | 0.29 |
| -20 | 0.76 | 0.50 | 0.19 | -0.14 | -0.47 | -0.76 | -0.95 | -1.01 | -0.96 | -0.82 | -0.62 | -0.40 | -0.16 | 0.29 |
| -21 | 0.72 | 0.45 | 0.16 | -0.15 | -0.45 | -0.70 | -0.87 | -0.93 | -0.89 | -0.77 | -0.60 | -0.38 | -0.16 | 0.30 |
| -22 | 0.68 | 0.42 | 0.13 | -0.16 | -0.43 | -0.65 | -0.79 | -0.84 | -0.82 | -0.72 | -0.56 | -0.37 | -0.15 | 0.30 |
| -23 | 0.65 | 0.39 | 0.12 | -0.15 | -0.39 | -0.59 | -0.71 | -0.77 | -0.75 | -0.66 | -0.52 | -0.34 | -0.13 | 0.30 |
| -24 | 0.62 | 0.37 | 0.12 | -0.13 | -0.35 | -0.53 | -0.64 | -0.69 | -0.67 | -0.60 | -0.47 | -0.31 | -0.11 | 0.30 |

COMPARATIVE EXAMPLE 2
TRANSMISSION ASTIGMATISM

EXAMPLE 2
TRANSMISSION ASTIGMATISM

COMPARATIVE EXAMPLE 1
TRANSMISSION ASTIGMATISM

EXAMPLE 1
TRANSMISSION ASTIGMATISM

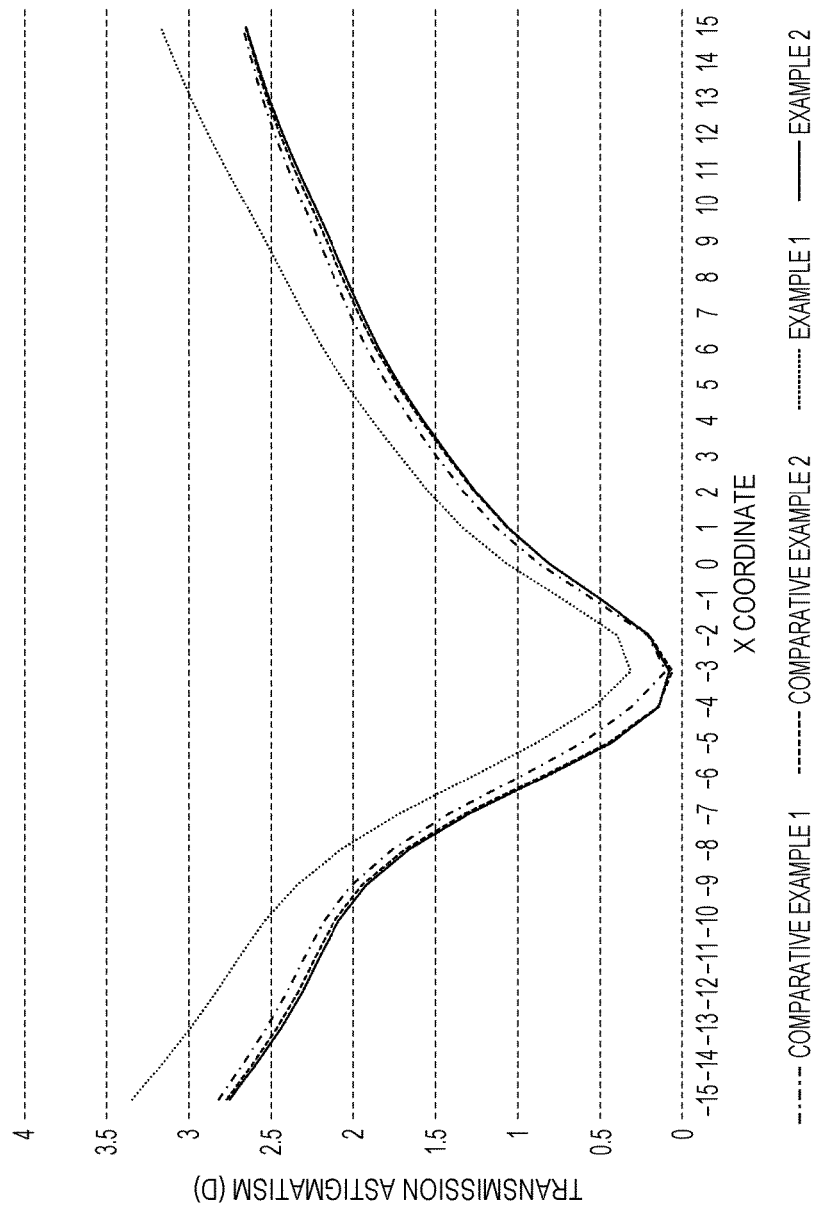

SURFACE REFRACTIVE POWER IN VERTICAL DIRECTION OF LENS INNER SURFACE SIDE NEAR PORTION (DV)
(BEFORE COMPONENT OF ASTIGMATISM IS REMOVED)

| X/Y | -10 | -9 | -8 | -7 | -6 | -5 | -4 | -3 | -2 | -1 | 0 | 1 | 2 | 3 | 4 |
|---|---|---|---|---|---|---|---|---|---|---|---|---|---|---|---|
| -4 | 1.55 | 1.56 | 1.57 | 1.58 | 1.59 | 1.59 | 1.58 | 1.55 | 1.49 | 1.42 | 1.37 | 1.34 | 1.34 | 1.36 | 1.37 |
| -5 | 1.73 | 1.73 | 1.73 | 1.73 | 1.73 | 1.71 | 1.68 | 1.62 | 1.54 | 1.47 | 1.43 | 1.42 | 1.43 | 1.47 | 1.50 |
| -6 | 1.90 | 1.88 | 1.87 | 1.86 | 1.84 | 1.81 | 1.75 | 1.67 | 1.60 | 1.54 | 1.51 | 1.51 | 1.54 | 1.58 | 1.63 |
| -7 | 2.06 | 2.03 | 2.01 | 1.98 | 1.94 | 1.87 | 1.80 | 1.72 | 1.66 | 1.62 | 1.61 | 1.62 | 1.66 | 1.71 | 1.76 |
| -8 | 2.23 | 2.20 | 2.16 | 2.10 | 2.02 | 1.93 | 1.85 | 1.78 | 1.74 | 1.71 | 1.72 | 1.74 | 1.79 | 1.84 | 1.90 |
| -9 | 2.38 | 2.33 | 2.27 | 2.19 | 2.09 | 1.99 | 1.90 | 1.85 | 1.81 | 1.81 | 1.83 | 1.87 | 1.91 | 1.97 | 2.02 |
| -10 | 2.49 | 2.42 | 2.34 | 2.24 | 2.13 | 2.03 | 1.96 | 1.91 | 1.89 | 1.90 | 1.93 | 1.98 | 2.03 | 2.08 | 2.13 |
| -11 | 2.54 | 2.46 | 2.36 | 2.26 | 2.16 | 2.08 | 2.01 | 1.96 | 1.96 | 1.98 | 2.03 | 2.07 | 2.12 | 2.17 | 2.22 |
| -12 | 2.56 | 2.47 | 2.38 | 2.29 | 2.20 | 2.12 | 2.06 | 2.02 | 2.02 | 2.06 | 2.11 | 2.16 | 2.21 | 2.25 | 2.31 |
| -13 | 2.57 | 2.49 | 2.40 | 2.32 | 2.24 | 2.16 | 2.10 | 2.08 | 2.09 | 2.12 | 2.18 | 2.23 | 2.27 | 2.32 | 2.37 |
| -14 | 2.57 | 2.49 | 2.42 | 2.35 | 2.27 | 2.20 | 2.15 | 2.13 | 2.15 | 2.18 | 2.23 | 2.28 | 2.33 | 2.37 | 2.42 |
| -15 | 2.56 | 2.49 | 2.43 | 2.36 | 2.29 | 2.23 | 2.19 | 2.18 | 2.20 | 2.24 | 2.28 | 2.33 | 2.37 | 2.41 | 2.45 |
| -16 | 2.54 | 2.49 | 2.43 | 2.36 | 2.30 | 2.26 | 2.24 | 2.24 | 2.25 | 2.28 | 2.32 | 2.36 | 2.39 | 2.43 | 2.47 |
| -17 | 2.53 | 2.48 | 2.42 | 2.37 | 2.32 | 2.30 | 2.28 | 2.29 | 2.30 | 2.32 | 2.35 | 2.38 | 2.41 | 2.45 | 2.48 |
| -18 | 2.52 | 2.47 | 2.42 | 2.38 | 2.35 | 2.33 | 2.33 | 2.34 | 2.35 | 2.36 | 2.38 | 2.40 | 2.43 | 2.46 | 2.50 |
| -19 | 2.51 | 2.47 | 2.43 | 2.40 | 2.38 | 2.37 | 2.38 | 2.38 | 2.39 | 2.39 | 2.40 | 2.42 | 2.45 | 2.48 | 2.51 |
| -20 | 2.52 | 2.48 | 2.45 | 2.42 | 2.42 | 2.42 | 2.42 | 2.43 | 2.43 | 2.43 | 2.44 | 2.45 | 2.47 | 2.50 | 2.53 |
| -21 | 2.53 | 2.50 | 2.47 | 2.45 | 2.45 | 2.45 | 2.46 | 2.46 | 2.46 | 2.46 | 2.47 | 2.48 | 2.50 | 2.52 | 2.55 |
| -22 | 2.55 | 2.52 | 2.50 | 2.48 | 2.48 | 2.48 | 2.49 | 2.49 | 2.49 | 2.49 | 2.49 | 2.50 | 2.52 | 2.54 | 2.56 |
| -23 | 2.56 | 2.54 | 2.52 | 2.51 | 2.51 | 2.51 | 2.51 | 2.52 | 2.52 | 2.52 | 2.52 | 2.52 | 2.53 | 2.55 | 2.57 |
| -24 | 2.57 | 2.55 | 2.54 | 2.53 | 2.53 | 2.53 | 2.54 | 2.54 | 2.54 | 2.54 | 2.54 | 2.54 | 2.55 | 2.56 | 2.58 |

SURFACE REFRACTIVE POWER IN HORIZONTAL DIRECTION OF LENS INNER SURFACE SIDE NEAR PORTION (DH)
(BEFORE COMPONENT OF ASTIGMATISM IS REMOVED)

| X/Y | -10 | -9 | -8 | -7 | -6 | -5 | -4 | -3 | -2 | -1 | 0 | 1 | 2 | 3 | 4 |
|---|---|---|---|---|---|---|---|---|---|---|---|---|---|---|---|
| -4 | 2.79 | 2.70 | 2.61 | 2.51 | 2.38 | 2.21 | 2.04 | 1.90 | 1.81 | 1.75 | 1.78 | 1.91 | 2.10 | 2.28 | 2.39 |
| -5 | 2.79 | 2.70 | 2.61 | 2.50 | 2.33 | 2.11 | 1.88 | 1.70 | 1.59 | 1.55 | 1.62 | 1.79 | 2.02 | 2.24 | 2.39 |
| -6 | 2.79 | 2.70 | 2.61 | 2.48 | 2.27 | 1.99 | 1.69 | 1.48 | 1.37 | 1.37 | 1.48 | 1.69 | 1.95 | 2.20 | 2.37 |
| -7 | 2.79 | 2.70 | 2.61 | 2.46 | 2.20 | 1.84 | 1.49 | 1.26 | 1.17 | 1.22 | 1.38 | 1.62 | 1.90 | 2.16 | 2.35 |
| -8 | 2.79 | 2.70 | 2.61 | 2.42 | 2.10 | 1.68 | 1.29 | 1.05 | 0.98 | 1.09 | 1.31 | 1.58 | 1.87 | 2.13 | 2.32 |
| -9 | 2.78 | 2.70 | 2.59 | 2.36 | 1.99 | 1.53 | 1.12 | 0.87 | 0.83 | 1.00 | 1.27 | 1.55 | 1.84 | 2.09 | 2.29 |
| -10 | 2.77 | 2.68 | 2.55 | 2.29 | 1.88 | 1.39 | 0.96 | 0.70 | 0.70 | 0.92 | 1.24 | 1.54 | 1.81 | 2.06 | 2.25 |
| -11 | 2.75 | 2.64 | 2.49 | 2.20 | 1.78 | 1.27 | 0.83 | 0.57 | 0.61 | 0.87 | 1.22 | 1.53 | 1.79 | 2.02 | 2.22 |
| -12 | 2.72 | 2.60 | 2.42 | 2.12 | 1.69 | 1.18 | 0.72 | 0.48 | 0.55 | 0.84 | 1.20 | 1.51 | 1.77 | 1.99 | 2.18 |
| -13 | 2.68 | 2.55 | 2.35 | 2.05 | 1.61 | 1.09 | 0.65 | 0.43 | 0.52 | 0.82 | 1.19 | 1.50 | 1.75 | 1.96 | 2.15 |
| -14 | 2.65 | 2.50 | 2.29 | 1.97 | 1.53 | 1.03 | 0.61 | 0.41 | 0.52 | 0.81 | 1.17 | 1.48 | 1.73 | 1.94 | 2.13 |
| -15 | 2.61 | 2.44 | 2.22 | 1.89 | 1.45 | 0.98 | 0.59 | 0.43 | 0.54 | 0.82 | 1.16 | 1.46 | 1.71 | 1.92 | 2.11 |
| -16 | 2.57 | 2.39 | 2.15 | 1.81 | 1.39 | 0.95 | 0.61 | 0.48 | 0.58 | 0.83 | 1.14 | 1.43 | 1.68 | 1.90 | 2.09 |
| -17 | 2.53 | 2.33 | 2.08 | 1.74 | 1.34 | 0.95 | 0.65 | 0.55 | 0.63 | 0.85 | 1.13 | 1.41 | 1.66 | 1.88 | 2.08 |
| -18 | 2.48 | 2.27 | 2.01 | 1.68 | 1.31 | 0.96 | 0.71 | 0.62 | 0.69 | 0.88 | 1.12 | 1.38 | 1.63 | 1.86 | 2.07 |
| -19 | 2.43 | 2.21 | 1.94 | 1.63 | 1.29 | 0.99 | 0.77 | 0.70 | 0.75 | 0.91 | 1.12 | 1.37 | 1.61 | 1.85 | 2.06 |
| -20 | 2.38 | 2.16 | 1.89 | 1.59 | 1.29 | 1.02 | 0.84 | 0.77 | 0.81 | 0.94 | 1.13 | 1.36 | 1.60 | 1.83 | 2.05 |
| -21 | 2.34 | 2.11 | 1.84 | 1.57 | 1.30 | 1.06 | 0.91 | 0.85 | 0.87 | 0.98 | 1.15 | 1.36 | 1.59 | 1.82 | 2.03 |
| -22 | 2.29 | 2.06 | 1.81 | 1.55 | 1.31 | 1.11 | 0.97 | 0.91 | 0.94 | 1.03 | 1.18 | 1.37 | 1.59 | 1.81 | 2.02 |
| -23 | 2.25 | 2.03 | 1.79 | 1.55 | 1.33 | 1.15 | 1.03 | 0.98 | 1.00 | 1.07 | 1.21 | 1.38 | 1.59 | 1.80 | 2.01 |
| -24 | 2.22 | 2.00 | 1.78 | 1.56 | 1.36 | 1.20 | 1.09 | 1.04 | 1.05 | 1.12 | 1.24 | 1.41 | 1.60 | 1.80 | 2.00 |

SURFACE REFRACTIVE POWER IN VERTICAL DIRECTION OF LENS INNER SURFACE SIDE NEAR PORTION (DV)
(AFTER COMPONENT OF ASTIGMATISM IS REMOVED)

| X/Y | -10 | -9 | -8 | -7 | -6 | -5 | -4 | -3 | -2 | -1 | 0 | 1 | 2 | 3 | 4 |
|---|---|---|---|---|---|---|---|---|---|---|---|---|---|---|---|
| -4 | 1.55 | 1.56 | 1.57 | 1.58 | 1.59 | 1.59 | 1.58 | 1.55 | 1.49 | 1.42 | 1.37 | 1.34 | 1.34 | 1.36 | 1.37 |
| -5 | 1.73 | 1.73 | 1.73 | 1.73 | 1.73 | 1.71 | 1.68 | 1.62 | 1.54 | 1.47 | 1.43 | 1.42 | 1.43 | 1.47 | 1.50 |
| -6 | 1.90 | 1.88 | 1.87 | 1.86 | 1.84 | 1.81 | 1.75 | 1.67 | 1.60 | 1.54 | 1.51 | 1.51 | 1.54 | 1.58 | 1.63 |
| -7 | 2.06 | 2.03 | 2.01 | 1.98 | 1.94 | 1.87 | 1.80 | 1.72 | 1.66 | 1.62 | 1.61 | 1.62 | 1.66 | 1.71 | 1.76 |
| -8 | 2.23 | 2.20 | 2.16 | 2.10 | 2.02 | 1.93 | 1.85 | 1.78 | 1.74 | 1.71 | 1.72 | 1.74 | 1.79 | 1.84 | 1.90 |
| -9 | 2.38 | 2.33 | 2.27 | 2.19 | 2.09 | 1.99 | 1.90 | 1.85 | 1.81 | 1.81 | 1.83 | 1.87 | 1.91 | 1.97 | 2.02 |
| -10 | 2.49 | 2.42 | 2.34 | 2.24 | 2.13 | 2.03 | 1.96 | 1.91 | 1.89 | 1.90 | 1.93 | 1.98 | 2.03 | 2.08 | 2.13 |
| -11 | 2.54 | 2.46 | 2.36 | 2.26 | 2.16 | 2.08 | 2.01 | 1.96 | 1.96 | 1.98 | 2.03 | 2.07 | 2.12 | 2.17 | 2.22 |
| -12 | 2.56 | 2.47 | 2.38 | 2.29 | 2.20 | 2.12 | 2.06 | 2.02 | 2.02 | 2.06 | 2.11 | 2.16 | 2.21 | 2.25 | 2.31 |
| -13 | 2.57 | 2.49 | 2.40 | 2.32 | 2.24 | 2.16 | 2.10 | 2.08 | 2.09 | 2.12 | 2.18 | 2.23 | 2.27 | 2.32 | 2.37 |
| -14 | 2.57 | 2.49 | 2.42 | 2.35 | 2.27 | 2.20 | 2.15 | 2.13 | 2.15 | 2.18 | 2.23 | 2.28 | 2.33 | 2.37 | 2.42 |
| -15 | 2.56 | 2.49 | 2.43 | 2.36 | 2.29 | 2.23 | 2.19 | 2.18 | 2.20 | 2.24 | 2.28 | 2.33 | 2.37 | 2.41 | 2.45 |
| -16 | 2.54 | 2.49 | 2.42 | 2.36 | 2.30 | 2.26 | 2.24 | 2.24 | 2.25 | 2.28 | 2.32 | 2.36 | 2.39 | 2.43 | 2.47 |
| -17 | 2.53 | 2.48 | 2.42 | 2.37 | 2.32 | 2.29 | 2.28 | 2.29 | 2.30 | 2.32 | 2.35 | 2.38 | 2.41 | 2.45 | 2.48 |
| -18 | 2.52 | 2.47 | 2.43 | 2.38 | 2.35 | 2.33 | 2.33 | 2.34 | 2.35 | 2.36 | 2.38 | 2.40 | 2.43 | 2.46 | 2.50 |
| -19 | 2.51 | 2.47 | 2.43 | 2.40 | 2.38 | 2.37 | 2.38 | 2.38 | 2.39 | 2.39 | 2.40 | 2.42 | 2.45 | 2.48 | 2.51 |
| -20 | 2.52 | 2.48 | 2.45 | 2.42 | 2.42 | 2.42 | 2.42 | 2.43 | 2.43 | 2.43 | 2.44 | 2.45 | 2.47 | 2.50 | 2.53 |
| -21 | 2.53 | 2.50 | 2.47 | 2.45 | 2.45 | 2.45 | 2.46 | 2.46 | 2.46 | 2.46 | 2.47 | 2.48 | 2.50 | 2.52 | 2.55 |
| -22 | 2.55 | 2.52 | 2.50 | 2.48 | 2.48 | 2.48 | 2.49 | 2.49 | 2.49 | 2.49 | 2.49 | 2.50 | 2.52 | 2.54 | 2.56 |
| -23 | 2.56 | 2.54 | 2.52 | 2.51 | 2.51 | 2.51 | 2.51 | 2.52 | 2.52 | 2.52 | 2.52 | 2.52 | 2.53 | 2.55 | 2.57 |
| -24 | 2.57 | 2.55 | 2.54 | 2.53 | 2.53 | 2.53 | 2.54 | 2.54 | 2.54 | 2.54 | 2.54 | 2.54 | 2.55 | 2.56 | 2.58 |

SURFACE REFRACTIVE POWER IN HORIZONTAL DIRECTION OF LENS INNER SURFACE SIDE NEAR PORTION (DH)
(AFTER COMPONENT OF ASTIGMATISM IS REMOVED)

| X/Y | -10 | -9 | -8 | -7 | -6 | -5 | -4 | -3 | -2 | -1 | 0 | 1 | 2 | 3 | 4 |
|---|---|---|---|---|---|---|---|---|---|---|---|---|---|---|---|
| -4 | 0.79 | 0.70 | 0.61 | 0.51 | 0.38 | 0.21 | 0.04 | -0.10 | -0.19 | -0.25 | -0.22 | -0.09 | 0.10 | 0.28 | 0.39 |
| -5 | 0.79 | 0.70 | 0.61 | 0.50 | 0.33 | 0.11 | -0.12 | -0.30 | -0.41 | -0.46 | -0.39 | -0.21 | 0.02 | 0.24 | 0.39 |
| -6 | 0.79 | 0.70 | 0.61 | 0.48 | 0.27 | -0.01 | -0.31 | -0.52 | -0.63 | -0.63 | -0.52 | -0.31 | -0.05 | 0.20 | 0.37 |
| -7 | 0.79 | 0.70 | 0.61 | 0.46 | 0.20 | -0.16 | -0.51 | -0.74 | -0.83 | -0.78 | -0.62 | -0.38 | -0.10 | 0.16 | 0.35 |
| -8 | 0.79 | 0.70 | 0.61 | 0.42 | 0.10 | -0.32 | -0.71 | -0.95 | -1.02 | -0.91 | -0.69 | -0.42 | -0.13 | 0.13 | 0.32 |
| -9 | 0.78 | 0.70 | 0.59 | 0.36 | -0.01 | -0.47 | -0.89 | -1.14 | -1.17 | -1.00 | -0.74 | -0.45 | -0.16 | 0.09 | 0.29 |
| -10 | 0.77 | 0.68 | 0.55 | 0.29 | -0.12 | -0.61 | -1.04 | -1.30 | -1.30 | -1.08 | -0.76 | -0.46 | -0.19 | 0.06 | 0.25 |
| -11 | 0.75 | 0.64 | 0.49 | 0.20 | -0.22 | -0.73 | -1.17 | -1.43 | -1.40 | -1.13 | -0.78 | -0.47 | -0.21 | 0.02 | 0.22 |
| -12 | 0.72 | 0.60 | 0.42 | 0.12 | -0.31 | -0.83 | -1.28 | -1.52 | -1.46 | -1.16 | -0.80 | -0.49 | -0.23 | -0.01 | 0.18 |
| -13 | 0.68 | 0.55 | 0.35 | 0.05 | -0.39 | -0.91 | -1.35 | -1.57 | -1.48 | -1.18 | -0.81 | -0.50 | -0.25 | -0.04 | 0.15 |
| -14 | 0.65 | 0.50 | 0.29 | -0.03 | -0.48 | -0.98 | -1.39 | -1.59 | -1.48 | -1.19 | -0.83 | -0.52 | -0.27 | -0.06 | 0.13 |
| -15 | 0.61 | 0.44 | 0.22 | -0.11 | -0.55 | -1.02 | -1.41 | -1.57 | -1.46 | -1.18 | -0.84 | -0.54 | -0.29 | -0.08 | 0.11 |
| -16 | 0.57 | 0.39 | 0.15 | -0.19 | -0.61 | -1.05 | -1.39 | -1.52 | -1.42 | -1.17 | -0.86 | -0.57 | -0.32 | -0.10 | 0.09 |
| -17 | 0.53 | 0.33 | 0.08 | -0.26 | -0.66 | -1.05 | -1.35 | -1.45 | -1.37 | -1.15 | -0.87 | -0.60 | -0.34 | -0.12 | 0.08 |
| -18 | 0.48 | 0.27 | 0.01 | -0.32 | -0.69 | -1.04 | -1.29 | -1.38 | -1.31 | -1.12 | -0.88 | -0.62 | -0.37 | -0.14 | 0.07 |
| -19 | 0.43 | 0.21 | -0.06 | -0.37 | -0.71 | -1.01 | -1.23 | -1.30 | -1.25 | -1.09 | -0.88 | -0.63 | -0.39 | -0.15 | 0.06 |
| -20 | 0.38 | 0.16 | -0.11 | -0.41 | -0.71 | -0.98 | -1.16 | -1.23 | -1.19 | -1.06 | -0.87 | -0.64 | -0.40 | -0.17 | 0.04 |
| -21 | 0.34 | 0.11 | -0.16 | -0.43 | -0.71 | -0.94 | -1.09 | -1.16 | -1.13 | -1.02 | -0.85 | -0.64 | -0.41 | -0.18 | 0.03 |
| -22 | 0.29 | 0.06 | -0.19 | -0.45 | -0.69 | -0.90 | -1.03 | -1.09 | -1.07 | -0.97 | -0.83 | -0.63 | -0.41 | -0.19 | 0.02 |
| -23 | 0.25 | 0.03 | -0.21 | -0.45 | -0.67 | -0.85 | -0.97 | -1.02 | -1.01 | -0.93 | -0.79 | -0.62 | -0.41 | -0.20 | 0.01 |
| -24 | 0.22 | 0.00 | -0.22 | -0.44 | -0.65 | -0.81 | -0.91 | -0.96 | -0.95 | -0.88 | -0.76 | -0.59 | -0.40 | -0.20 | 0.00 |

PROGRESSIVE POWER LENS

TECHNICAL FIELD

The present invention relates to a progressive power lens, in particular relates to a progressive power lens having a both-sides composite progressive structure.

BACKGROUND ART

A progressive power lens has a part in which a power is progressively changed, and fields of view for viewing different distances (for example, a distance portion for distance vision, a near portion for near vision or the like) can be obtained by a single lens, and therefore the progressive power lens is mainly used as a glasses lens for correction for presbyopia.

Various progressive power lenses having various surface configurations are known, and one of them is a progressive power lens having a so-called both-sides composite progressive structure (for example, see Patent Literature 1). In the progressive power lens having the both-sides composite progressive structure, a power, which is progressively changed, is divided into a power change in a vertical direction of the lens (namely, an up and down direction in use of the lens) and a power change in a horizontal direction of the lens (namely, a left and right direction in use of the lens), and sharing rates in respective directions suitable for two surfaces of a front and a rear surfaces are defined, and thereby one progressive power lens is formed. Specifically, for example, a surface configuration in which the power change in the vertical direction of the lens having a progressive refractive power function is given to only an object side surface (namely, a convex surface), and the power change in the horizontal direction of the lens is given to only an eyeball side surface (namely, a concave surface) is adopted. In such a surface configuration, the front and the rear surfaces of the lens are formed in aspherical surfaces without having a progressive surface, respectively.

Accordingly, the progressive power lens having the both-sides composite progressive structure is structurally different from any of "an outer surface progressive power lens" in which a progressive surface is arranged on an object side surface, "an inner surface progressive power lens" in which the progressive surface is arranged on an eyeball side surface, and "a both-sides progressive power lens" in which the progressive surfaces are used for the front and the rear surfaces and a desired addition power is shared by the front and the rear surfaces. According to the progressive power lens having the both-sides composite progressive structure having such a surface configuration, both of an advantage of "the outer surface progressive power lens" in which a swing angle of an eyeball when a line of sight is moved between respective fields of view corresponding to different distances can be less, and an advantage of "the inner surface progressive power lens" in which a jumping and warping of images can be reduced by suppressing magnification difference between respective fields of view corresponding to the different distances can be obtained.

Here, in a glasses lens including a progressive power lens having a both-sides composite progressive structure, it is known as general technical common knowledge that to form a meniscus shape such that an object side surface is formed by a convex surface and an eyeball side surface is formed by a concave surface (for example, see paragraph [0031] in Patent Literature 1).

CITATION LIST

Patent Literature

Patent Literature 1: JP 3617004 B

SUMMARY OF INVENTION

Technical Problem

However, in the progressive power lens having the both-sides composite progressive structure, since the power change in the vertical direction of the lens and the power change in the horizontal direction of the lens are divided and distributed to the front and the rear surfaces of the lens respectively, when a desired addition power is obtained while keeping the meniscus shape, a surface refractive power (namely, a depth of a lens curve) in the vertical direction of the lens of the object side surface is in a tendency to be larger. Especially, in a lens having a positive power, since the lens curve of the eyeball side surface becomes thin as a whole, in order to keep the meniscus shape including a near portion, it is necessary to ensure the depth of the lens curve of the object side surface to some extent. Accordingly, in the progressive power lens having the both-sides composite progressive structure, the lens carve of the eyeball side surface becomes deeper, and therefore a thickness of the lens for glasses becomes thicker compared to a progressive power lens having a surface configuration in which a progressive surface is arranged on at least one of the front and the rear surfaces of the lens. Thus, the progressive power lens having the both-sides composite progressive structure has a unique problem in which outer appearance, performance in fashion or the like as the lens for glasses is deteriorated.

Thus, an object of the present invention is to provide a progressive power lens having a both-sides composite progressive structure capable of suppressing a surface refractive purer (namely, a depth of a lens curve) to be large and capable of achieving thinning of a thickness of the lens.

Solution to Problem

The present invention is devised in order to achieve the object described above.

According to a first aspect of the present invention, there is provided a progressive power lens including:
an object side surface;
an eyeball side surface; and
at least a near portion having a power for near vision, wherein
the object side surface includes a power change in a vertical direction of the lens having a progressive refractive power function,
the eyeball side surface includes a power change in a horizontal direction of the lens having the progressive refractive power function,
when a surface refractive power in the horizontal direction is defined as DHn and a surface refractive power in the vertical direction is defined as DVn in a near power measurement point N in the object side surface, a relational expression of DHn<DVn is fulfilled, and
the near portion of the eyeball side surface has a shaped part in which the signs of positive and negative of a surface refractive power in the vertical direction of the lens and a surface refractive power in the horizontal direction of the lens are opposite to each other.

Advantageous Effects of Invention

According to the present invention, in the progressive power lens having the both-sides composite progressive structure, the surface refractive power (namely, the depth of the lens curve) is suppressed to be large and the progressive power lens is suppressed to be thick, and thereby outer appearance, performance in fashion or the like as the lens for glasses can be improved.

DESCRIPTION OF DRAWINGS

FIGS. 1A and 1B are diagrams for explaining a specific example of a basic configuration of a progressive power lens, in which FIG. 1A is a front view thereof and FIG. 1B is a side view thereof.

FIG. 2 is a diagram illustrating a list for explaining specific examples of a distribution of an addition power in each of the progressive power lenses having the both-sides composite progressive structure and progressive power lenses having other surface configuration.

FIGS. 4A to 4C are diagrams for explaining a specific example of a relationship between the surface refractive power in the progressive power lens having the both-sides composite progressive structure and the surface refractive power in the progressive power lenses having other surface configurations, in which FIG. 4A is a diagram illustrating the surface refractive power of an outer surface progressive power lens, FIG. 4B is a diagram illustrating the surface refractive power of the progressive power lens having the both-sides composite progressive structure, and FIG. 4C is a diagram illustrating the surface refractive power of an inner surface progressive power lens.

FIGS. 5A to 5C are diagrams for explaining a specific example of the surface refractive power in the progressive power lenses having a distance power of S+6.00 D and an addition power of ADD+2.00 D, in which FIG. 5A is a diagram illustrating the surface refractive power in the progressive power lens having the both-sides composite progressive structure according to the present invention, FIG. 5B is a diagram illustrating the surface refractive power in the progressive power lens having the both-sides composite progressive structure of a conventional configuration, and FIG. 5C is a diagram illustrating the surface refractive power in the outer surface progressive power lens.

FIG. 8 is a diagram for concretely explaining a lens surface refractive power of the examples according to the present invention and Comparative Examples.

FIGS. 11A and 11B are diagrams for concretely explaining the surface refractive power in the vertical direction in the lens surfaces of Example 1 according to the present invention and Comparative Example 1, in which FIG. 11A is a diagram illustrating the surface refractive power of Example 1 and FIG. 11B is a diagram illustrating the surface refractive power of Comparative Example 1.

FIGS. 14A to 14D are diagrams illustrating a specific example of distribution of transmission astigmatism of Examples 1, 2 according to the present invention and the comparative examples 1, 2, in which FIG. 14A is a diagram illustrating the distribution of the transmission astigmatism in Comparative Example 1, FIG. 14B is a diagram illustrating the distribution of the transmission astigmatism in Comparative Example 2, FIG. 14C is a diagram illustrating the distribution of the transmission astigmatism in Example 1, and FIG. 14D is a diagram illustrating the distribution of the transmission astigmatism in Example 2.

FIG. 15 is a diagram for explaining the specific examples of the transmission astigmatism on a horizontal section passing a near portion measurement reference point compared among Examples 1, 2 according to the present invention and Comparative Examples 1, 2.

DESCRIPTION OF EMBODIMENTS

Figure 3:
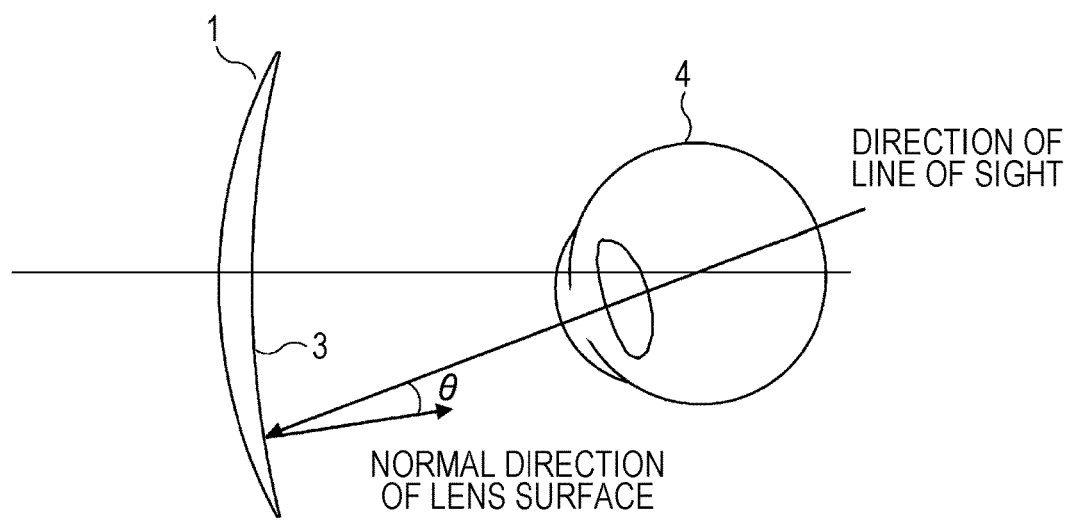
FIG. 3 is a diagram for explaining one example of a relationship between a lens shape and a direction of a line of sight.

Hereinafter, an embodiment of the present invention is described with reference to drawings.

1. Basic Configuration of Progressive Power Lens Having Both-Sides Composite Progressive Structure At first, a basic configuration of a progressive power lens having a both-sides composite progressive structure is described.

(Basic Configuration of Progressive Power Lens)

FIGS. 1A and 1B are diagrams for explaining a specific example of a basic configuration of a progressive power lens. The example figures illustrate an example of a configuration of a so-called distance-near type progressive power lens 1.

As shown in FIG. 1A, in the distance-near type progressive power lens 1, a distance portion 11 formed as a part for a field of view having a power for distance vision is arranged at an upper side in a lens surface, and a near portion 12 formed as a part for a field of view having a power for near vision is arranged at a lower side in the lens surface. Further, a corridor 13 in which a power is progressively changed is arranged between the distance portion 11 and the near portion 12, and therefore the distance portion 11 and the near portion 12 are smoothly connected by the corridor 13.

In such a progressive power lens 1, as shown in FIG. 1B, all performance which is required in the progressive power lens 1 is given by two surfaces of a surface 2 located at an object side in use of glasses (hereinafter, referred to as merely "object side surface" or "outer surface") and a surface 3 located at an eyeball side (hereinafter, referred to as merely "eyeball side surface" or "inner surface"). Thus, the distance portion 11, the near portion 12 and the corridor 13 are achieved by using the two surfaces 2, 3.

Here, the distance-near type lens is described as an example, as the progressive power lens 1, a so-called intermediate-near type lens, a near-near type lens or the like is known. Namely, the progressive power lens 1 in the present description is provided with the corridor 13 in which the power is progressively changed, and therefore the progressive power lens 1 may have at least the near portion 12, which has the power for near vision, arranged in the lens surface.

(Surface Configuration of Progressive Power Lens Having Both-Sides Composite Progressive Structure)

As the progressive power lens 1 provided with the basic configuration described above, various lenses having various surface configurations are known, and as one of them, a progressive power lens having a both-sides composite progressive structure is known. In the progressive power lens having the both-sides composite progressive structure, the power progressively changed is divided into a power change in a vertical direction of the lens and a power change in a horizontal direction of the lens, and sharing rates in respective directions suitable for two surfaces of a front and a rear surfaces are defined, and thereby one progressive power lens 1 is formed. Specifically, for example, a surface configuration in which the power change in the vertical direction of the lens is given only to the object side surface (outer surface) 2, and the power change in the horizontal direction of the lens is given only to the eyeball side surface (inner surface) 3 is adopted. In such a surface configuration, the outer surface 2 and the inner surface 3 of the lens are formed by aspherical surfaces without having a progressive surface, respectively. Here, the progressive surface denotes a surface in which the distance portion 11 and the near portion 12 are connected in a region called as a corridor in which surface astigmatism is set to be a minimum (approximately 0.25 D to 0.50 D), and by combining the surface and a spherical surface or a toric surface, a necessary function (correction for presbyopia) for the progressive power lens can be obtained. Accordingly, the progressive power lens having the both-sides composite progressive structure is structurally different from any of "an outer surface progressive power lens" in which a progressive surface is arranged on the outer surface, "an inner surface progressive power lens" in which the progressive surface is arranged on the inner surface, and "a both-sides progressive power lens" in which the progressive surface is given to both of the front and the rear surfaces and a desired addition power is shared by the front and the rear surfaces.

FIG. 2 is a diagram illustrating a list for explaining specific examples of a distribution of an addition power in each of the progressive power lenses having the both-sides composite progressive structure and progressive power lenses having other surface configuration.

As shown in the example figure, in the outer surface progressive power lens (see a row of "outer surface" in figure), 100% of the power changes (namely, a required addition power) in both of the vertical direction of the lens and the horizontal direction of the lens are given to the object side surface 2. Further, in the inner surface progressive power lens (see a row of "inner surface" in figure), 100% of the power changes (namely, a required addition power) in both of the vertical direction of the lens and the horizontal direction of the lens are given to the eyeball side surface 3. Further, in one example of the both-sides progressive power lens (see a row of "both-sides 1" in figure), 50% of the power changes (namely, a required addition power) in both of the vertical direction of the lens and the horizontal direction of the lens are given to the object side surface 2 and the eyeball side surface 3, respectively. Further, in another example of the both-sides progressive power lens (see a row of "both-sides 2" in figure), 30% of the power changes (namely, a required addition power) in both of the vertical direction of the lens and the horizontal direction of the lens are given to the object side surface 2 and 70% of those are given to the eyeball side surface 3, respectively.

Against these configuration, in one example of the progressive power lens having the both-sides composite progressive structure (see a row of "both-sides composite 1" in figure), 100% of the power change in the vertical direction of the lens (namely, a vertical addition power) is given to the object side surface 2 and 100% of the power change in the horizontal direction (namely, a horizontal addition power) is given to the eyeball side surface 3. Further, in another example of the progressive power lens having the both-sides composite progressive structure (see a row of "both-sides composite 2" in figure), 100% of the power angle in the vertical direction of the lens (namely, a vertical addition power) is given to the object side surface 2, and 25% of the power change of the horizontal direction of the lens (namely, a horizontal addition power) is given to the object side surface 2 and 75% of that is given to the eyeball side surface 3, respectively. Further, in another example of the progressive power lens having the both-sides composite progressive structure (see a row of "both-sides composite 3" in figure), 150% of the power change in the vertical direction of the lens (namely, a vertical addition power) is given to the object side surface 2 and −50% of that is given to the eyeball side surface 3 respectively, and 100% of the power change in the horizontal direction of the lens (namely, horizontal addition power) is given to the eyeball side surface 3. As described in each of the specific examples, in the progressive power lens having the both-sides composite progressive structure, the power which is changed progressively is divided into the power change in the vertical direction of the lens and the power change in the horizontal direction of the lens, and sharing rates in respective directions suitable for the two faces of the front and the rear surface are defined, and thereby one progressive power lens is formed, and this configuration is different from any of the outer surface progressive power lens, the inner surface progressive power lens, and the both-sides progressive power lens.

The progressive power lens having the both-sides composite progressive structure provided with such a surface configuration can include both advantages of the outer surface progressive power lens and the inner surface progressive power lens Specifically, since a structure in which the power change in the vertical direction of the lens relating to a corridor length is arranged on the outer surface 2 and the power change in the horizontal direction of the lens relating to the jumping and the warping of images is arranged on the inner surface 3 is adopted, both the advantage of the outer surface progressive power lens in which a swing angle of an eyeball when a line of sight is moved between respective fields of view corresponding to different distances can be less and the advantage of the inner surface progressive power lens in which the jumping and the warping of images can be reduced by suppressing magnification difference between respective fields of view corresponding to the different distances can be obtained. Further, according to the progressive power lens having the both-sides composite progressive structure, the front and the rear surfaces of the lens can be used in a composite manner, and clear field of view can be spread in all of the distance portion, the intermediate portion, and the near portion, and especially, the jumping and the warping of images in a periphery of the lens can be improved.

(Design Procedure of Progressive Power Lens Having Both-Sides Composite Progressive Structure)

The progressive power lens having the both-sides composite progressive structure as described above is obtained through a schematic procedure of optical design described below. The design procedure of the progressive power lens having the both-sides composite progressive structure includes at least a step of setting information (S1), a step of designing both sides as an outer surface progressive power lens (S2), and a step of converting to a convex shape of a both-sides composite progressive structure and designing a concave shape brought with that (S3).

In the step of setting information (S1), input information required for the design of the progressive power lens is acquired. The input information is mainly divided into item specific information as specific data of a lens item, and user specific information as specific data of a lens user. The item specific information includes information relating to a refractive index n of lens material, a progressive surface design parameter represented by a corridor length and the like. The user specific information includes information relating to a distance power (spherical power S, astigmatism power C, astigmatism axis AX, prism power P, prism base direction PAX or the like), an addition power ADD, layout data (distance PD, near PD, eye point position or the like), a frame shape and the like.

In the step of designing the both sides as an outer surface progressive power lens (S2), a surface shape formed as an outer surface progressive power lens is designed in a lens outer surface (a convex surface) and a lens inner surface (a concave surface) based on the received input information. Specifically, in order to obtain the addition power ADD or the corridor length received as the input information, the surface shape of the convex surface (namely, the progressive surface) formed as an outer surface progressive power lens is designed in accordance with the progressive surface design parameter as the input information. Further, in order to obtain the distance power received as the input information, the surface shape of the concave surface (for example, a spherical surface or a toric surface as an astigmatism correction surface) is designed. These designs may be performed by using a well-known technique.

In the step of converting to the convex shape of the both-sides composite progressive structure and designing the concave shape brought with that (S3), the surface shape of the convex surface (namely, the progressive surface) formed as outer surface progressive power lens is converted into a surface shape of a convex surface in the both-sides composite progressive structure in accordance with the distance power, the addition power ADD or the like received as the input information. Specifically, in the convex surface formed as an outer surface progressive power lens, as the surface refractive power in the horizontal direction is defined as DHf and the surface refractive power in the vertical direction is defined as DVf in a distance power measurement point F, and the surface refractive power in the horizontal direction is defined as DHn and the surface refractive power in the vertical direction is defined as DVn in a near power measurement point N (see FIG. 1A), a progressive power surface is set to fulfill the relational expressions of DHf+DHn<DVf+DVn and DHn<DVn, or alternatively, to fulfill the relational expressions of DVn−DVf>ADD/2 and DHn−DHf<ADD/2.

At this time, it is preferable that the convex surface is converted to the surface shape of the convex surface in the both-sides composite progressive structure without changing an average surface refractive power in the whole of the convex surface. For example, it is considered to keep a total average value of the surface refractive powers in the vertical direction and the horizontal direction of the distance portion and the near portion. However, it is preferable to set within a region which keeps the meniscus shape in which the object side surface is formed in a convex shape and the eyeball side surface is formed in a concave shape.

Further, after converting into the convex surface shape of the both-sides composite progressive structure, a deformation amount in converting is added to a surface shape of the concave surface (namely, the spherical surface or the toric surface as the astigmatism correction surface) formed as an outer surface progressive power lens. Namely, the same amount as the deformation amount in converting is added to a side of the lens inner surface (a concave surface). The deformation is like "bending" which bends the lens itself, but it is necessary to pay attention to that it is not uniform deformation over the whole surface, and therefore the surface fulfill the relational expressions described above.

(Meniscus Shape)

Here, it is preferable that the lens for glasses including the progressive power lens keeps the meniscus shape. One reason thereof is considered as below.

FIG. 3 is a diagram for explaining one example of a relationship between the lens shape and a direction of line of sight.

As shown in the example figure, in a case in which the lens for glasses 1 is formed in a meniscus shape, when an eyeball 4 is swung and a direction of a line of sight is directed to an outside of an axis, an angle θ between the line of sight and a normal line of the lens surface on a lens surface 3 at the eyeball side can be small. Thus, in a case in which the angle θ is small, generation of the astigmatism in the periphery region of the lens can be suppressed compared to a case in which the angle is large.

(Thickness of Progressive Power Lens Having Both-Sides Composite Progressive Structure)

In the Progressive Power Lens having the both-sides composite progressive structure, as described above, since the power changes in the vertical direction of the lens and the power change in the horizontal direction of the lens are divided and distributed to the front and the rear surfaces of the lens respectively, when the meniscus shape is kept in a whole of the lens, it is considered that the surface refractive power in the object side surface becomes large compared to the progressive power lens in which the progressive surface is arranged on at least one of the front and the rear surfaces of the lens. Especially, in a case in which the lens has a positive power, the surface refractive power is in a tendency to be larger. The "surface refractive power" denotes a lens curve, and as a refractive index of lens material is defined as n and a curvature radius of the surface is defined as r (unit is meter), the surface refractive power of the surface is represented by an expression of Surface Refractive Power=$(n-1)/r$.

Here, a relationship between the surface refractive power of the progressive power lens having the both-sides composite progressive structure and the surface refractive power of the progressive power lens having other surface configuration is briefly described.

FIGS. 4A to 4C are diagrams for explaining a specific example of the relationship between the surface refractive power of the progressive power lens having the both-sides composite progressive structure and the surface refractive power of the progressive power lens having other surface configuration. Further, in the figures, in a case in which the surface refractive power is changed in the object side surface (the outer surface), a hatching pattern is applied to the section of the lens, and in a case in which the surface refractive power is changed in the eyeball side surface (the inner surface), a dotted pattern is applied to the section of the lens.

As shown in FIG. 4A, in the outer surface progressive power lens, as the addition power ADD becomes larger, the surface refractive power of the object side surface (the outer surface) in the near portion becomes larger in both of the vertical direction of the lens and the horizontal direction of the lens. Namely, as the addition power ADD becomes larger, the lens curve of the outer surface in the near portion becomes deeper.

Further, as shown in FIG. 4C, in the inner surface progressive power lens, as the addition power ADD becomes larger, the surface refractive power of the eyeball side surface (the inner surface) in the near portion becomes smaller in both of the vertical direction of the lens and the horizontal direction of the lens. Namely, as the addition power ADD becomes larger, the lens curve of the inner surface in the near portion becomes shallower.

Against these, in the progressive power lens having the both-sides composite progressive structure, as shown in FIG. 4B, as the addition power ADD becomes larger, the surface refractive power of the object side surface (the outer surface) in the near portion becomes larger while the surface refractive power of the eyeball side surface (the inner surface) in the near portion becomes smaller. Namely, as the addition power ADD becomes larger, the lens curve of the outer surface in the near portion becomes deeper while the lens curve of the inner surface in the near port becomes shallower.

In this way, in the progressive power lens having the both-sides composite progressive structure, as the addition power ADD becomes larger, the curve in the vertical direction of the lens in the object side surface becomes deeper and the curve in the horizontal direction of the lens in the eyeball side surface becomes shallower, and in such a case, when the meniscus shape is kept, it is necessary to ensure the depth of the curve in the object side surface to some extent. Accordingly, when the desired addition power is obtained while keeping the meniscus shape, the thickness of the lens for glasses becomes thicker compared to the outer surface progressive power lens, the inner surface progressive power lens and the like.

FIGS. 5A to 5C are diagrams for explaining a specific example of the surface refractive power in the progressive power lenses. In the example figures, the progressive power lens having the distance power S of +6.00 diopter (D) and the addition power of ADD+2.00 D is illustrated as an example.

For example, in the outer surface progressive power lens, since the progressive surface is arranged only on the object side surface, as shown in FIG. 5C, when the surface refractive power of the eyeball side surface is to be 0.00 D as much as possible, the surface refractive power of the object side surface (the depth of the lens curve) can be a minimum while keeping the meniscus shape. Accordingly, in a case in which S+6.00 D and ADD+2.00 D are to be achieved, the surface refractive power of the shallowest object side surface, which is needed to keep the meniscus shape, is +6.00 D.

Against this, for example, in the progressive power lens having the both-sides composite progressive structure of a conventional genera configuration in which the power change in the vertical direction of the lens is given only to the object side surface and the power change in the horizontal direction of the lens is given only to the eyeball side surface, in a case in which S+6.00 D and ADD+2.00 D are to be achieved, as shown in FIG. 5B, it is necessary to set the surface refractive power in the horizontal direction of the lens in the near portion of the object side surface to be +8.00 D even if the surface refractive power in the horizontal direction of the lens of the eyeball side surface is set to be 0.00 D. At this time, since the surface refractive power in the horizontal direction of the lens is not changed in the object side surface, the surface refractive power in the horizontal direction of the lens in the distance portion becomes +8.00 D. Thus, in a case in which S+6.00 D and ADD+2.00 D are to be achieved, in the object side surface, the surface refractive power in the vertical direction of the lens in the distance portion becomes +8.00 D and that in the near portion becomes +10.00 D. Namely, in the progressive power lens having the both-sides composite progressive structure of the conventional general configuration, in a case in which S+6.00 D and ADD+2.00 D are to be achieved, the surface refractive power of the shallowest object side surface, which is needed to keep the meniscus shape, is +8.00 D, and larger than the outer surface progressive power lens (see FIG. 5C).

In this way, in the progressive power lens having the both-sides composite progressive structure, when the desired addition power is to be obtained while keeping the meniscus shape, the curve of the object side surface in the vertical direction of the lens becomes deeper and the curve of the eyeball side surface in the horizontal direction of the lens becomes shallower. Especially, in the lens having the positive power as shown in the example in FIGS. 5A to 5C, since the eyeball side surface becomes shallower as a whole, order to keep the meniscus shape including the near portion, it is necessary to ensure the depth of the curve of the object side surface to some extent. Accordingly, compared to the progressive power lens having the surface configuration in which the progressive surface is arranged on at least one of the front and the rear surfaces of the lens, the lens for glasses is in the tendency to be thicker, and thus the progressive power lens having the both-sides composite progressive structure has a unique problem in which outer appearance, performance in fashion or the like as the lens for glasses is deteriorated.

(Knowledge of Present Inventors)

As the lens for glasses becomes thicker, the outer appearance, the performance in fashion or the like as the lens for glasses is deteriorated, and therefore it is preferable that the surface refractive power (namely, the depth of the lens curve) is suppressed to be larger when the both-sides composite progressive structure is adopted to the lens for glasses.

In order to solve the unique problem of the progressive power lens having the both-sides composite progressive structure, the present inventors conducted a study.

In the progressive power lens having the both-sides composite progressive structure, it is necessary to ensure the depth of the curve of the object side surface to some extent because the lens curve of the eyeball side surface becomes shallower, namely it is because it is desired to obtain the desired addition power while keeping the meniscus shape. However, the progressive power lens having the both-sides composite progressive structure has a specific surface configuration in which the power change in the vertical direction of the lens and the power change in the horizontal direction of the lens are divided and distributed to the front and the rear surfaces of the lens respectively.

Thus, the present inventors focused on the specific surface configuration in the progressive power lens having the both-sides composite progressive structure, and the present inventors deemed the surface refractive power in the vertical direction of the lens and the surface refractive power in the horizontal direction of the lens in the eyeball side surface to be independent and obtained an idea that it may be possible to suppress the lens curve of the object side surface to be deeper by suppressing the lens curve of the eyeball side surface to be shallower. More specifically, the present inventors deemed the surface refractive power in the vertical direction of the lens and the surface refractive power in the horizontal direction of the lens in the eyeball side surface to be independent and obtained the idea that it may be possible to suppress the surface refractive power of the object side surface to be larger by arranging a shaped part which does not keep the meniscus shape partially on the eyeball side surface.

The present invention is completed based on a novel idea by the present inventors in which a shaped part which does not keep the meniscus shape partially is arranged without adhering to a general concept relating to the lens for glasses which keeps the meniscus shape.

2. Specific Configuration of Progressive Power Lens Having Both-Sides Composite Progressive Structure According to the Present Embodiment Hereinafter, a specific configuration of the progressive power lens having the both-sides composite progressive structure according to one embodiment of the present invention is described. Further here, as the progressive power lens having the both-sides composite progressive structure, a configuration (see FIG. 2) in which 100% of the power change in the vertical direction of the lens (namely, the vertical addition power) is given to the object side surface (the outer surface) 2 and 100% of the power change in the horizontal direction of the lens (namely, the horizontal addition power) is given to the eyeball side surface (the inner surface) 3 is described as an example.

The progressive power lens having the both-sides composite progressive structure described in the present embodiment has a large characteristic in which "a saddle like part" describe below arranged in a region part which achieves a function as the near portion of the eyeball side surface (hereinafter, referred to as merely "the near portion of the eyeball side surface"). Further, the position and the region of the near portion in the lens surface are defined by the optical design procedure described above.

(Saddle Like Part)

The saddle like part is a shaped part in which the signs of positive and negative of the surface refractive power in the vertical direction of the lens and the surface refractive power in the horizontal direction of the lens are opposite to each other.

"The vertical direction of the lens" denotes an up and down direction in use of the lens. Further, the up and down direction is not limited to the strict sense of the vertical direction, and the up and down direction includes a direction equivalent to the vertical direction.

"The horizontal direction of the lens" denotes a left and right direction in use of the lens. Further, the left and right direction is not limited to the strict sense of the horizontal direction, and the left and right direction includes a direction equivalent to the horizontal direction.

"The surface refractive power" denotes a lens curve, and as a refractive index of lens material is defined as n, and a curvature radius of the surface is defined as r (unit is meter), the surface refractive power in the surface is represented an expression of Surface Refractive Power=(n−1)/r.

"The signs of positive and negative of the surface refractive power" denotes a sign of positive and negative adhered to a value of the surface refractive power and denotes a direction of a concave shape and a convex shape of the lens curve. Here, the lens curve protruding in a convex manner toward the object side surface (the outer surface) (namely, the lens curve recessed in a recessed manner seen from the eyeball side surface (the inner surface)) is defined as "the surface refractive power is positive", and opposite to this, the lens curve protruding in a convex manner toward the eyeball side surface (the inner surface) is defined as "the surface refractive power is negative".

Further, "the signs of positive and negative of the surface refractive powers are opposite" denotes that the sign of positive and negative relating to the surface refractive power in the vertical direction of the lens and the sign of positive and negative relating to the surface refractive power in the horizontal direction of the lens are different from each other. Specifically, for example, in a case of the progressive power lens having the both-sides composite progressive structure in which the power change in the vertical direction of the lens is given to the object side surface and the power change in the horizontal direction of the lens is given to the eyeball side surface, in the saddle like part, the surface refractive power in the vertical direction of the lens is positive and the power change in the horizontal direction of the lens is negative.

Figure 6:
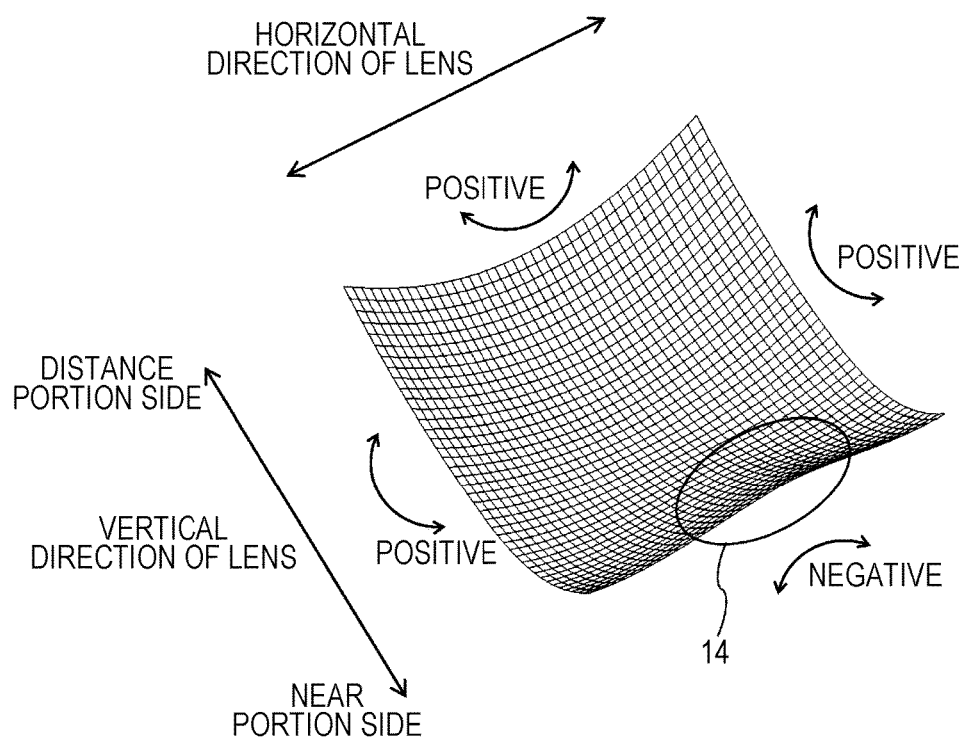
FIG. 6 is a diagram for explaining a concept of a lens surface shape of the progressive power lens according to the present invention, in which a three dimensional shape of the lens surface shape provided with a saddle like part is schematically illustrated by a lattice.

FIG. 6 is a diagram for explaining a three dimensional shape of the lens surface provided with the saddle like part schematically illustrated by a lattice. The example figure illustrates the lens inner surface seen from the eyeball side in a diagonal direction. Further, in the example figure, a plane shape of the lens surface is illustrated as a rectangular shape for an easy understanding, but the actual plane shape of the lens surface is formed in a circular shape before lens fitting processing to a frame is performed.

As shown in the example figure, the progressive power lens having the both-sides composite progressive structure described in the present embodiment has a saddle like part 14 in the near portion of the eyeball side surface (the lens inner surface). With this, the eyeball side surface in the progressive power lens has a convex shaped plus curve toward the outer surface in the whole surface region in the vertical direction of the lens and the surface refractive power is made "positive" Further, the eyeball side surface has a convex shaped plus curve toward the cuter surface at a side of the distance portion in the horizontal direction of the lens and the surface refractive power is made "positive". However, since the saddle like part 14 is arranged at a side of the near portion, the part corresponding to the saddle like part 14 has a convex shaped minus curve toward the inner surface and the surface refractive power is made "negative". In this way, in the near portion of the eyeball side surface in the progressive power lens, the saddle like part 14 in which the signs of positive and negative of the surface refractive power in the vertical direction of the lens and the surface refractive power in the horizontal direction of the lens are opposite to each other is arranged.

The signs of "positive" and "negative" of the surface refractive power in the saddle like part 14 and other part are set as described above, but magnitude of its value is not limited to a specific value. The value of the surface refractive power in each part is determined in the optical design procedure described above based on the received item specific information, the received user specific information or the like.

Further, a position or the like in the near portion in which the saddle like part 14 is arranged is not limited to a specific configuration. The position and a region of the saddle like part 14 are, similarly to the position and the region of the near portion, appropriately defined in the optical design procedure described above based on the received item specific information, the received user specific information or the like.

Further, the saddle like part 14 is arranged to be apparent in a surface not including a component of prescribed astigmatism.

For example, in the step of designing both sides as an outer surface progressive power lens (S2) in the design procedure described above, in a case in which the lens inner surface (the concave surface) is formed in a spherical surface (in a case in which astigmatism is not prescribed, an astigmatism correction surface is arranged on the outer surface of the lens or the like) the shaped part as the saddle like part 14 becomes apparent in the lens inner surface. Namely, the shaped part in which the signs of positive and negative of the surface refractive powers in the vertical direction of the lens and the surface refractive power in the horizontal direction of the lens are opposite to each other, exists apparently as a shape in the lens inner surface. However, this shall not apply in a case in which the lens inner surface is formed as the astigmatism correction surface. Generally, the correction for astigmatism is performed by a toric surface (or alternatively, a troidal surface) arranged to be inclined to correspond to an astigmatism axis. Thus, in a case which the lens inner surface is formed as the astigmatism correction surface, a component of prescribed astigmatism is added to the shaped part as the saddle like part 14, and the shape of the saddle like part 14 is collapsed, and thereby the saddle like part 14 is buried in the surface shape after the addition of the component of the prescribed astigmatism. However, even if the saddle like part 14 is buried in the surface including the component of the prescribed astigmatism, the saddle like part 14 may be formed to be apparent after the component of the prescribed astigmatism is removed from the surface. It is because a functional effect described below can be obtained, similarly to the configuration in which the saddle like part 14 is apparent, as long as the shaped part as the saddle like part 14 exists in the lens inner surface even if the shaped part is latent.

Namely, the saddle like part 14 may be arranged such that its shape is to be apparent in the surface originally not including the component of the prescribed astigmatism or in the surface from which the component of the prescribed astigmatism is virtually removed. In the description below, it is mainly described by using a state in which the shape as the saddle like part 14 is apparent as an example, but even if the shaped part is latent, as long as the saddle like part 14 becomes apparent after the component of the prescribed astigmatism is removed, a similar function can be achieved.

As described above, the progressive power lens having the both-sides composite progressive structure according to the present embodiment has the saddle like part 14 at a partial region in the near portion of the eyeball side surface (the lens inner surface), and the surface refractive power in the horizontal direction of the lens in the regional part in which the saddle like part 14 is arranged is made "negative". Namely, in the lens inner surface, the shaped part which keeps the meniscus shape in the whole region of the surface in the vertical direction of the lens while does not keep the meniscus shape in the partial region in the near portion in the horizontal direction of the lens (specifically, the shaped part formed in the convex shape so as to be protruded toward both surfaces of the outer surface and the inner surface) is arranged. Accordingly, compared to a case in which the meniscus shape is also kept in the horizontal direction of the lens (namely, the surface refractive power is "positive"), when the same distance power, the same addition power ADD or the like is set, magnitude of each of the surface refractive powers (namely, the depth of the lens curve) in the vertical direction of the lens and the horizontal direction of the lens in the lens outer surface can be made relatively small. In this way, in the progressive power lens having the both-sides composite progressive structure according to the present embodiment, since the saddle like part 14 is arranged in the partial region in the near portion of the lens inner surface, for example, even if the addition power ADD is set to be large, compared to a case in which the meniscus shape is kept in both of the outer surface and the inner surface, the surface refractive power of the object side surface can be suppressed to be large (namely, the lens curve can be suppressed to be deep).

Specifically as shown in FIG. 5A, for example in a case in which S+6.00 D and ADD+2.00 D are achieved, since the progressive power lens having the both-sides composite progressive structure according to the present embodiment has the saddle like part 14 in the partial region in the near portion of the lens inner surface, the surface refractive power in the horizontal direction of the lens of the lens inner surface is made partially "negative". Namely, the surface refractive power in the horizontal direction of the lens in the near portion of the lens inner surface becomes for example −2.00 D. In a case in which the surface refractive power in the horizontal direction of the lens in the near portion of the lens inner surface is −2.00 D, the surface refractive power in the horizontal direction of the lens in the near portion of the lens outer surface is +6.00 D. At this time, since the surface refractive power in the horizontal direction of the lens is not changed in the lens outer surface, the surface refractive power in the horizontal direction of the lens in the distance portion becomes also +6.00 D. Thus, in a case in which S+6.00 D and ADD+2.00 D are achieved, in the lens outer surface, the surface refractive power in the vertical direction of the lens is set to be +6.00 D in the distance portion and +8.00 D in the near portion. Namely, in the progressive power lens having the both-sides composite progressive structure according to the present embodiment, in a case in which S+6.00 D and ADD+2.00 D are achieved, compared to the progressive power lens having the both-sides composite progressive structure of the general configuration (see FIG. 5B), the surface refractive power of the lens out surface can be made small (namely, the lens curve can be made shallow) and the surface refractive power of the lens outer surface can be suppressed to the same extent as the outer surface progressive power lens (see FIG. 5C).

In addition, in the progressive power lens having the both-sides composite progressive structure according to the present embodiment, the meniscus shape is kept in the whole region in the surface in the horizontal direction of the lens. Thus, the lens curve of the lens outer surface is suppressed to be deep by arranging the saddle like part 14 in the lens inner surface, and at the same time at least in the vertical direction of the lens (namely, the swing direction of the eyeball when the line of sight is moved between the distance portion and the near portion), an advantage in an optical characteristic by forming the meniscus shape can be obtained. Namely, for example, compared to a case in which the meniscus shape is not kept in both of the vertical direction of the lens and the horizontal direction of the lens, degree of deterioration (generation of the astigmatism or the like) of the optical characteristic can be suppressed.

(Aspherical Surface Correction)

Here, as described above, in the progressive power lens having the both-sides composite progressive structure according to the present embodiment, the shaped part which does not keep the meniscus shape partially in the horizontal direction of the lens is arranged by providing the saddle like part 14 in the partial region in the near portion of the lens inner surface, and thereby the lens curve of the lens outer surface is suppressed to be deep. However, since the shaped part which does not keep the meniscus shape partially in the horizontal direction of the lens is arranged, the deterioration (generation of the astigmatism or the like) of the optical characteristic may be occurred compared to, for example, a case in which the meniscus shape is kept in both of the vertical direction of the lens and the horizontal direction of the lens. Thus, in the progressive power lens having the both-side composite progressive structure according to the present embodiment, it is preferable that the eyeball side surface provided with the saddle like part 14 is subjected to aspherical surface correction which corrects the deterioration of the optical characteristic caused by the saddle like part 14.

Hereinafter, the aspherical surface correction applied to the eyeball side surface is described.

Here, "the aspherical surface correction" corrects the deterioration of the optical characteristic caused by the saddle like part 14. Accordingly, aspherical surface correction (hereinafter, referred to as "other aspherical surface correction" in order to distinguish from the aspherical surface correction), which corrects deterioration of the optical characteristic not caused by the saddle like part 14, for example the deterioration of the optical characteristic caused by a progressive power function of the front and the rear surfaces of the lens, is not included in "the aspherical surface correction" described here. However, the present embodiment does not exclude "other aspherical surface correction", and apart from "the aspherical surface correction" or in addition to "the aspherical surface correction", "other aspherical surface correction" may be applied to at least one of the front and rear surfaces of the lens. Further, "other aspherical surface correction" may be performed by using a well-known technique, and the detailed description thereof is therefore omitted.

Examples of the deterioration of the optical characteristic caused by the saddle like part 14 include astigmatism or power error generated by cause in which a line of sight and the lens surface are not perpendicular to each other in use of the lens due to the saddle like part 14, the jumping of images generated in a peripheral vision of the saddle like part 14, or the like. Namely, "the aspherical surface correction" performs the correction to remove or reduce at least one of aspects as the deterioration of the optical characteristic caused by the saddle like part 14 of the astigmatism or the power error generated by cause in which a line of sight and the lens surface are not perpendicular to each other in used of the lens, and the jumping of images generated in a peripheral vision of the saddle like part 14.

Such "the aspherical surface correction" may be performed by a step of correcting a concave surface by transmission design (S4) in addition to each step of S1 to S3 in the optical design procedure described above.

The transmission design is a design method to obtain an original optical function in a state in which a user actually uses the lens for glasses, namely it is the design method to add "correction effect" for removing or reducing the generation of the astigmatism, the change in power or the like mainly generated by cause in which a line of sight and the lens surface are not perpendicular to each other. Specifically, a difference from the original optical performance as a target is gasped by a strict calculation of tracing beam in accordance with a direction of the line of sight, and surface correction (curve correction) which cancels the difference is performed. Further, by repeating this, the difference is made a minimum, and thereby an appropriate solution can be obtained.

Generally, it is difficult to directly calculate the lens surface shape having a targeted optical performance, and it is impossible in most cases. This is because "the lens surface shape having an arbitrary set optical characteristic" does not always exist. However, contrary to this, it is relatively easy to calculate "the optical characteristic of the arbitrary set lens surface shape". Accordingly, at first, a primary approximated surface is calculated by an arbitrary method, and then a design parameter is adjusted in accordance with an evaluation result of the optical characteristic of the lens surface shape using the approximated surface, and the lens surface shape is sequentially changed and it is returned to the evaluation step, and thereby this configuration makes it possible to close the targeted optical performance by repeating reevaluation and readjustment. This method is called "optimization" and it is one example of the well-known methods.

As described above, in the progressive power lens having the both-sides composite progressive structure according to the present embodiment, the eyeball side surface provided with the saddle like part 14 is subjected to "the aspherical surface correction". Accordingly, in a case in which the shaped part which does not keep the meniscus shape partially in the horizontal direction of the lens due to the saddle like part 14 is arranged, the deterioration of the optical characteristic such as the transmission astigmatism, the transmission power error, the generation of the jumping of images in the peripheral vision or the like caused by that can be suppressed.

Further, by applying "the aspherical surface correction", in a case in which the shaped part which does not keep the meniscus shape due to the saddle like part 14 is arranged, namely, in a case in which the shaped part in which the surface refractive power is "negative" and which is formed in a reversed curve seen from other part is arranged, an amount of the reversed curve (magnitude of the surface refractive power being "negative") is reduced and therefore it is possible that the region to be the reversed curve is less. This is because in the process of application of "the aspherical surface correction", the method called "optimization" is performed and the amount of the reversed curve can be adjusted by the "optimization", and thereby the necessary amount of the reversed curve can be less. Namely, in a case in which "the aspherical surface correction" is applied to the eyeball side surface provided with the saddle like part 14, the deterioration of the optical characteristic due to the saddle like part 14 can be suppressed, and thinning of the thickness of the lens as a whole of the progressive power lens having the both-sides composite progressive structure becomes possible, and further reduction of the amount of the reversed curve necessary for the thinning can be achieved. Further, it is preferable that the amount of the reversed curve is less from a viewpoint of ensuring a good optical characteristic, but according to the knowledge of the present inventors, the optical characteristic capable of enduring use as the lens for glasses can be ensured even if the amount of the reversed curve is the same as the addition power in the maximum.

Further, "the aspherical surface correction" in here may be applied to at least the eyeball side surface provided with the saddle like part 14. Namely, since "the aspherical surface correction" suppresses the deterioration of the optical characteristic caused by the saddle like part 14, it is considered that "the aspherical surface correction" should be applied to the eyeball side surface provided with the saddle like part 14, but it is not limited to this, and therefore "the aspherical surface correction" may be performed by using both surfaces of the eyeball side surface and the object side surface.

3. Effect of the Present Embodiment

According to the progressive power lens having the both-sides composite progressive structure described as the present embodiment, the following effects are obtained.

The progressive power lens having the both-sides composite progressive structure according to the present embodiment has the saddle like part 14 in the near portion of the eyeball side surface. Namely, by focusing on the specific surface configuration in the progressive power lens having the both-sides composite progressive structure and deeming the surface refractive power in the vertical direction of the lens and the surface refractive power in the horizontal direction of the lens in the eyeball side surface to be independent, the shaped part (namely, the saddle like part 14) in which the signs of positive and negative of the surface refractive powers in the vertical direction of the lens and the surface refractive power in the horizontal direction of the lens are opposite to each other, is arranged in the near portion of the eyeball side surface.

In this way, in a case in which the shaped part which does not keep the meniscus shape partially in the eyeball side surface is arranged, compared to a case in which the meniscus shape is kept in a whole surface region of the eyeball side surface (namely, a case in which both of the surface refractive power of the vertical direction of the lens and the surface refractive power of the horizontal direction of the lens are "positive"), when the same distance power, the same addition power ADD or the like is set, magnitude of each of the surface refractive powers (namely, the depth of the lens curve) in the vertical direction of the lens and the horizontal direction of the lens of the object side surface can be made relatively small. In other words, by arranging the saddle like part 14 in the near portion of the eyeball side surface, for example even if the addition power ADD is large, compared to a case in which the meniscus shape is to be kept in both of the outer surface and the inner surface, the surface refractive power of the object side surface can be suppressed to be large (namely, the lens curve can be suppressed to be deep). Namely, the progressive power lens having the both-sides composite progressive structure according to the present embodiment is completed based on a novel idea in which the shaped part which does not keep the meniscus shape partially is arranged without adhering to a general concept relating to the lens for glasses which keeps the meniscus shape by arranging the saddle like part 14 in the eyeball side surface according to the novel idea.

Accordingly, according to the progressive power lens having the both-sides composite progressive structure according to the present embodiment, even if the both-sides composite progressive structure is adopted, the surface refractive power can be suppressed to be large, and the thinning of the thickness of the lens can be achieved by suppressing the progressive power lens to be thick, and as a result, the outer appearance, the performance in fashion or the like as the lens for glasses can be improved.

Further, since the saddle like part 14 is formed as the shaped part in which the signs of positive and negative of the surface refractive power in the vertical direction of the lens and the surface refractive power in the horizontal direction of the lens are opposite to each other, even if such saddle like part 14 is arranged, compared to a case in which the surface refractive powers in both of the vertical direction of the lens and the horizontal direction of the lens are "negative" the degree of the deterioration (generation of the astigmatism or the like) of the optical characteristic can be suppressed.

Further, in the progressive power lens having the both-sides composite progressive structure according to the present embodiment, the surface configuration in which the power change in the vertical direction of the lens is given to the object side surface and the power change in the horizontal direction of the lens is given to the eyeball side surface is adopted. Namely, the structure in which the power change in the vertical direction of the lens relating to the corridor length is arranged on the outer surface and the power change in the horizontal direction of the lens relating to the jumping and the warping of images is arranged on the inner surface is adopted. Accordingly, according to the progressive power lens having the both-sides composite progressive structure according to the present embodiment, both of the advantage of the outer surface progressive power lens in which a swing angle of an eyeball when a line of sight is moved between respective fields of view corresponding to different distances can be less and the advantage of the inner surface progressive power lens in which the jumping and the warping of images can be reduced by suppressing the magnification difference between respective fields of view corresponding to the different distances can be obtained. Further, the front and the rear surfaces of the lens can be used in a composite manner, and clear field of view can be spread in all of the distance portion, the intermediate portion, and the near portion, and especially, the jumping and the warping of images in a periphery of the lens can be improved.

Further, in the saddle like part 14, the surface refractive power in the vertical direction of the lens is "positive" and the power change in the horizontal direction of the lens is "negative", and when the power change in the vertical direction of the lens and the power change in the horizontal direction of the lens are divided and distributed to the front and the rear surfaces of the lens so as to have both advantages of the outer surface progressive power lens and the inner surface progressive power lens, the degree of the deterioration of the optical characteristic can be suppressed and the surface refractive power of the object side surface can be suppressed to be large (namely, the lens curve can be suppressed to be deep).

Further, as long as the aspherical surface correction which corrects the deterioration of the optical characteristic caused by the saddle like part 14 is applied to at least the eyeball side surface provided with the saddle like part 14 such as in the progressive power lens having the both-sides composite progressive structure according to the present embodiment, even if the shaped part which does not keep the meniscus shape partially due to the saddle like part 14 is arranged, the deterioration of the optical characteristic caused by that can be suppressed. Further, in the process of the application of "the aspherical surface correction", since the amount of the reversed curve in the shaped part which does not keep the meniscus shape can be reduced by performing the method called "optimization", thinness of a whole of the lens can be ensured while enhancing the optical characteristic, and the amount to be the reversed curve partially can be reduced and the region to be the reversed curve can be made small.

Further, in the progressive power lens having the both-sides composite progressive structure according to the present embodiment, the shaped part formed as the saddle like part 14 becomes apparent in the surface not including the component of the prescribed astigmatism, and this configuration can deal with a prescription for the astigmatism appropriately. Namely, in a case to deal with the prescription for the astigmatism, the shaped part formed as the saddle like part 14 does not lead any bad influence to a surface shape for correcting the astigmatism. Further, in a case to deal with the prescription for the astigmatism, when the surface shape in which the shaped part formed as the saddle like part 14 becomes apparent after the component of the prescribed astigmatism is removed is adopted, the surface refractive power in the object side surface can be firmly suppressed to be large (namely, the lens curve can be suppressed to be deep) due to the shaped part formed as the saddle like part 14.

4. Modified Example or the Like

Hereinabove, one embodiment of the present invention is concretely described, but the above-disclosed content merely shows one exemplary embodiment of the present invention. Namely, the scope of the present invention is not limited to the one exemplary embodiment described above, and the present invention can be modified within the scope of the subject matter of the present invention.

For example, in the embodiment described above, as the progressive power lens having the both-sides composite progressive structure, the surface configuration in which the power change in the vertical direction of the lens is given to the object side surface and the power change in the horizontal direction of the lens is given to the eyeball side surface is described as an example. However, the progressive power lens having the both-sides composite progressive structure according to the present invention is not limited to such a surface configuration, and the present invention can be applied to a surface configuration in which the power change in the vertical direction of the lens and the power change in the horizontal direction of the lens are divided and distributed to the object side surface and the eyeball side surface, respectively. Accordingly, the present invention can be similarly applied to a surface configuration, for example, in which the power change in the horizontal direction of the lens is given to the object side surface and the power change in the vertical direction of the lens is given to the eyeball side surface. In a case in which the present invention is applied to such a surface configuration, the saddle like part may be formed such that the surface refractive power in the vertical direction of the lens is to be "negative" and the power change in the horizontal direction of the lens is to be "positive" in the near portion of the eyeball side surface.

Further, in the embodiment described above, for example, as the progressive power lens having the both-sides composite progressive structure, the surface configuration in which 100% of the power change in the vertical direction of the lens (namely, the vertical addition power) is given to the object side surface and 100% of the power change in the horizontal direction of the lens (namely, the horizontal addition power) is given to the eyeball side surface is described as an example. However, the progressive power lens having the both-sides composite progressive structure according to the present invention is not limited to such a surface configuration, and the present invention can be applied to a surface configuration in which the power progressively changed is divided into the power change in the vertical direction of the lens and the power change in the horizontal direction of the lens, and sharing rates in respective directions suitable for two surfaces of the front and the rear surfaces are defined, and thereby one progressive power lens is formed. Specifically, the surface refractive powers in the vertical direction and the horizontal direction of the distance portion and the near portion at a side of the lens outer surface may be set to fulfill the relational expressions of $DHf+DHn<DVf+DVn$ and $DHn<DVn$, or alternatively, to fulfill the relational expressions of $DVn-DVf>ADD/2$ and $DHn-DHf<ADD/2$. Accordingly, the present invention can be similarly applied to a surface configuration, for example, in which each of the sharing rates of the progressive function in the vertical direction of the lens of the object side surface and the sharing rate of the progressive function in the horizontal direction of the lens of the eyeball side surface is set to at least exceed 50%. In a case in which the present invention applied to such a surface configuration, an amount of a positive curve and an amount of a reversed curve which form the saddle like part are adjusted in accordance with a proportion of each of the sharing rates.

Further, in the embodiment described above, for example, as the relational expressions that the surface refractive powers in the vertical direction and the horizontal direction of the distance portion and the near portion at the side of the lens outer surface fulfills, $DHf+DHn<DVf+DVn$ is described as an example, but the progressive power lens having the both-sides composite progressive structure according to the present invention may fulfill at least the relational expression of $DHn\ DVn$. Namely, the progressive power lens having the both-sides composite progressive structure according to the present invention may fulfill the relational expression of $DHf+DHn>DVf+DVn$, or $DHf+DHn=DVf+DVn$ as long as the relational expression of $DHn<DVn$ is fulfilled.

EXAMPLES

Next, the present invention is concretely described with reference to examples. However, it is obvious that the present invention is not limited to the examples described below.

Figure 7:
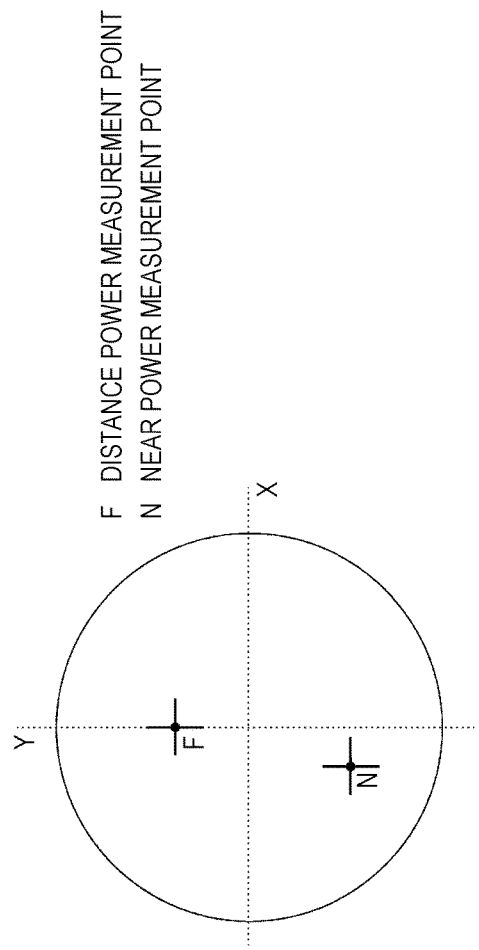
FIG. 7 is a diagram for concretely explaining a design condition in the lenses of examples according to the present invention and comparative examples.

FIG. 7 is a diagram for concretely explaining a design condition in lenses of examples and comparative examples described below.

As shown in the example figures, in Examples 1, 2 and Comparative Examples 1, 2 described below, it is described using the progressive power lens having the both-sides composite progressive structure in which, as the lens geometrical center is defined as the origin (0, 0) a coordinate value (unit: mm) of a distance power measurement point F is (x, y)=(0.0, 8.0), a coordinate value (unit: mm) of a near power measurement point N is (x, y)=(−3.4, −14.0), the distance power S (unit: D) is 6.00, the astigmatism power C (unit: D) is 0.00, the astigmatism axis AX (unit: degree) is 0, the addition power ADD (unit: D) is 2.50, and the thickness of lens (unit: mm) is 6.0. Further, in Example 3 described below, it is described using the progressive power lens having the both-sides composite progressive structure in which the astigmatism power C is −2.00 in addition to the design condition of the lens described above.

FIG. 8 is a diagram for concretely explaining a lens surface refractive power of the examples and the comparative examples. The meaning of each item in the figure is as below, and the unit of each item is D (Diopter).

DVf1: Surface refractive power in the vertical direction in the distance power measurement point F1 of the object side surface DHf1: Surface refractive power in the horizontal direction in the distance power measurement point F1 of the object side surface DVn1: Surface refractive power in the vertical direction in the near power measurement point N1 of the object side surface DHn1: Surface refractive power in the horizontal direction in the near power measurement point N1 of the object side surface DVf2: Surface refractive power in the vertical direction in the distance power measurement point F2 of the eyeball side surface DHf2: Surface refractive power the horizontal direction in the distance power measurement point F2 of the eyeball side surface DVn2: Surface refractive power in the vertical direction in the near power measurement point N2 of the eyeball side surface DHn2: Surface refractive power in the horizontal direction ire the near power measurement point N2 of the eyeball side surface Comparative Examples 1, 2

Here, at first, Comparative Examples 1, 2 to be compared with the examples of the present invention are briefly described. Comparative Example 1 is a conventional general progressive power lens having a both-sides composite progressive structure. Comparative Example 2 is a progressive power lens having a both-sides composite progressive structure in which the progressive power lens of Comparative Example 1 is subjected to the aspherical surface correction which corrects the deterioration of the optical characteristic (corresponding to "other aspherical surface correction" described above).

As shown in the example figure, in both of the progressive power lenses according to Comparative Examples 1, 2, in order to keep the meniscus shape in a whole surface region, each of the surface refractive power in the vertical direction and the surface refractive power in the horizontal direction is made a value of "positive".

Example 1

A progressive power lens according to Example 1 has the saddle like part 14 in a partial region in the near portion of the lens inner surface. As apparent from FIG. 8, the progressive power lens according to Example 1 has the saddle like part 14 and thereby the surface refractive power in the horizontal direction of the lens is made "negative" in the partial region in the near portion of the lens inner surface.

Figure 9:
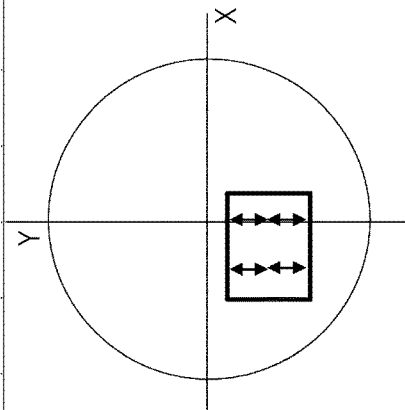
FIG. 9 is a diagram for concretely explaining the surface refractive power in the vertical direction of the lens in a lens inner surface near portion of Example 1 according to the present invention.
Figure 10:
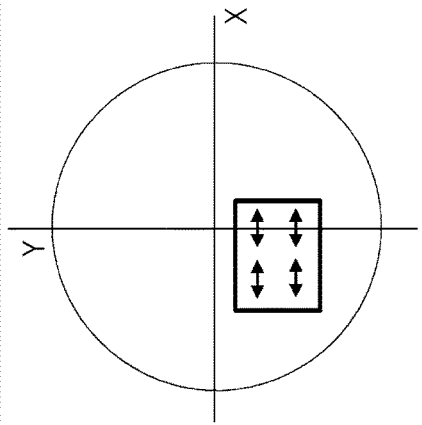
FIG. 10 is a diagram for concretely explaining the surface refractive power in the horizontal direction of the lens in the lens inner surface near portion of Example 1 according to the present invention.

More specifically, in the progressive power lens according to Example 1, the surface refractive power in the near portion of the lens inner surface is set as shown in FIG. 9 and FIG. 10.

FIG. 9 is a diagram for concretely explaining the surface refractive power in the vertical direction of the lens in the lens inner surface near portion of Example 1. FIG. 10 is a diagram for concretely explaining the surface refractive power in the horizontal direction of the lens in the lens inner surface near portion of Example 1. Further, the example figures illustrate a specific value of the surface refractive power only in the partial region around the near power measurement point N.

As apparent from FIG. 9 and FIG. 10, in the progressive power lens according to Example 1, the surface refractive power is made "positive" and the meniscus shape is kept in the vertical direction of the lens, and a part in which the surface refractive power is made "negative" (in a frame illustrated by a bold line in figure) is arranged in the partial region in the near portion in the horizontal direction of the lens.

Figure 11A:
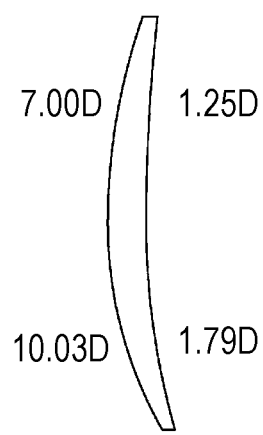

FIG. 11A is a diagram illustrating a specific example of the surface refractive power of a lens surface of Example 1. Further, in drawing, a specific example of the surface refractive power of a lens surface of Comparative Example is also shown as FIG. 11B.

Figure 11B:
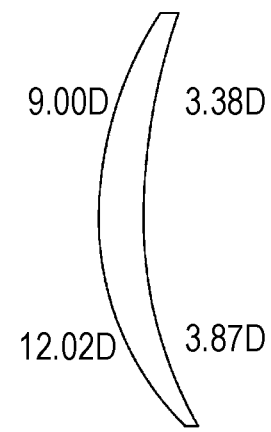

As apparent from FIGS. 11A and 11B, since the progressive power lens according to Example 1 has the saddle like part 14 in a partial region in the near portion of the lens inner surface and the surface refractive power in the horizontal direction of the lens in the partial region is made "negative", when compared to a case in which the meniscus shape is kept in a whole surface region of the lens inner surface as shown in Comparative Example 1, even if the same distance power, the same addition power ADD or the like is set (see FIG. 7), magnitude of the surface refractive power (namely, the depth of the lens curve) of the lens outer surface can be made relatively small. This is also apparent from FIG. 8. Accordingly, the progressive power lens according to Example 1 can achieve the thinning of the thickness of the lens easily compared to Comparative Example 1.

Example 2

The progressive power lens according to Example 2 has the saddle like part 14 in a partial region in the near portion of the lens inner surface, and the aspherical surface correction which corrects the deterioration of the optical characteristic caused by the saddle like part 14 is applied. Namely, the progressive power lens according to Example 2 is formed by adding the aspherical surface correction to the progressive power lens of Example 1. Accordingly, also in the progressive power lens according to Example 2, as apparent from FIG. 8, the surface refractive power in the horizontal direction of the lens is made "negative" in the partial region in the near portion of the lens inner surface.

Figure 12:
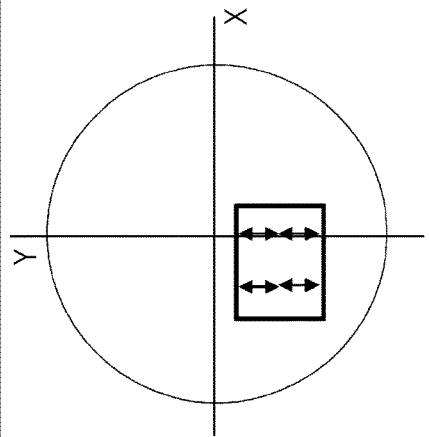
FIG. 12 is a diagram for concretely explaining the surface refractive power in the vertical direction of the lens in the lens inner surface near portion of Example 2 according to the present invention.
Figure 13:
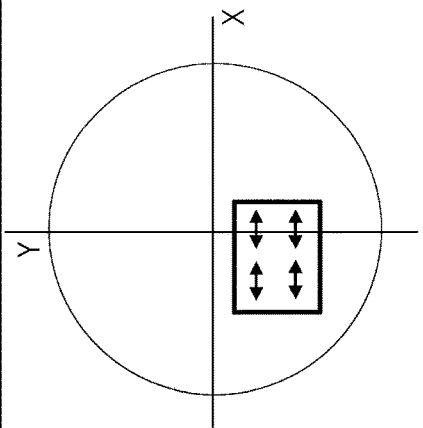
FIG. 13 is a diagram for concretely explaining the surface refractive power in the horizontal direction of the lens in the lens inner surface near portion of Example 2 according to the present invention.

More specifically, in the progressive power lens according to Example 2, the surface refractive power in the near portion of the lens inner surface is set as shown in FIG. 12 and FIG. 13.

FIG. 12 is a diagram for concretely explaining the surface refractive power in the vertical direction of the lens in the lens inner surface near portion of Example 2, and FIG. 13 is a diagram for concretely explaining the surface refractive power in the horizontal direction of the lens in the lens inner surface near portion of Example 2. Further, the example figures illustrate a specific value of the surface refractive power only in the partial region around the near power measurement point N.

As apparent from FIG. 12 and FIG. 13, in the progressive power lens according to Example 2, the surface refractive power is made "positive" and the meniscus shape is kept in the vertical direction of the lens, and a part in which the surface refractive power is made "negative" (inside a frame illustrated by a bold line in figure) is arranged in the partial region in the near portion in the horizontal direction of the lens.

Accordingly, also in the progressive power lens according to Example 2, similarly to Example 1, compared to Comparative Example 1, magnitude of the surface refractive power (namely, the depth of the lens curve) of the lens outer surface can be made relatively small (see FIG. 8), and the thinning of the thickness of the lens can be easily achieved.

Here, in a case in which the saddle like part 14 is merely arranged for the thinning of the thickness of the lens as shown in Example 1, the deterioration of the optical characteristic (the generation of the astigmatism or the like) might be occurred compared to a case in which the meniscus shape is kept in the whole surface region of the lens inner surface as shown in Comparative Examples 1, 2.

FIGS. 14A to 14D are diagrams illustrating a specific example of distribution of transmission astigmatism of Examples 1, 2, and Comparative Examples 1, 2. Each of illustrations in the figures corresponds to a circular region having a radius of 25 mm on the lens, and a pitch of the coordinate is set to 5 mm. Further, an interval of a contour is set to 0.25 D.

Figure 14B:
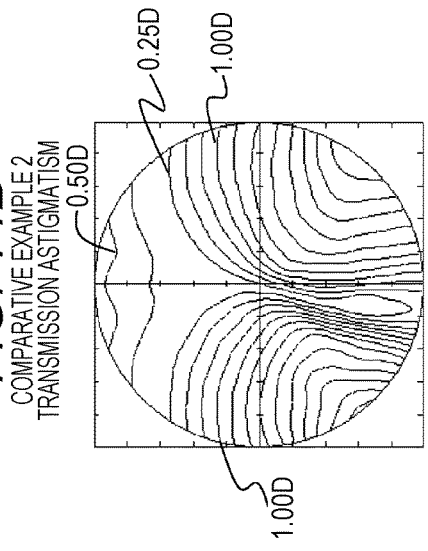
Figure 14D:
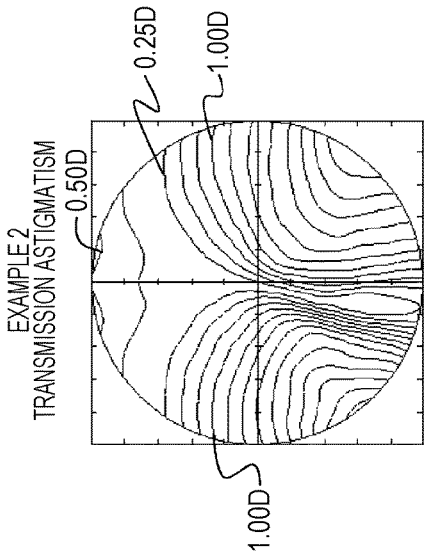
Figure 14A:
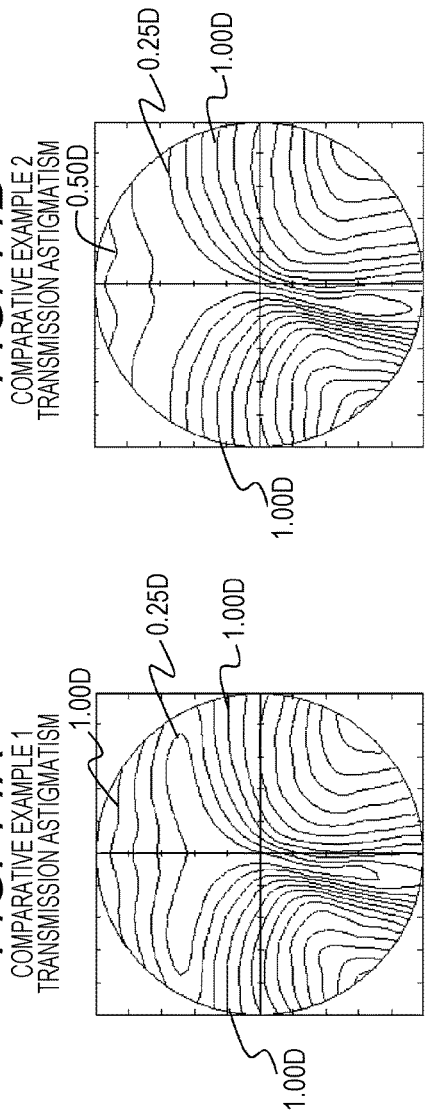
Figure 14C:
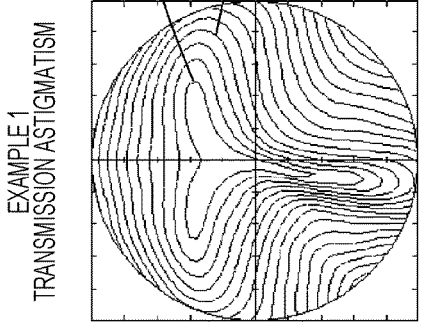

As shown in the example figures, compared to the distributions of the transmission astigmatism in Comparative Examples 1, 2 (see FIGS. 14A, 14B), the aberration is increased at a peripheral part in the lens surface in the distribution of the transmission astigmatism in Example 1 (see FIG. 14C).

The progressive power lens according to Example 2 is subjected to the aspherical surface correction in order to cancel such an increment of the aberration. Specifically, in the progressive power lens according to Example 2, the correction for removing or reducing at least one item of the astigmatism and the power error generated by cause in which the line of sight and the lens surface are not perpendicular to each other in use of the lens due to the saddle like part 14 and the jumping of images generated in the peripheral vision of the saddle like part 14 is applied. Further, in the progressive power lens according to Example 2, "other aspherical surface correction" which is not caused by the saddle like part 14 is also applied.

By applying the aspherical surface correction, as shown in FIG. 14D, the progressive power lens according to Example 2 can obtain substantially the same distribution of the transmission astigmatism as that of Comparative Example 2 (see FIG. 14B).

FIG. 15 is a diagram for explaining the specific examples of the transmission astigmatism on a horizontal section passing a near portion measurement reference point compared among Examples 1, 2, and Comparative Examples 1, 2.

According to the example figure, in the progressive power lens according to Example 2, the transmission astigmatism on the horizontal section passing the near portion measurement reference point is also substantially the same as that of the comparative example 2.

Namely, the progressive power lens according to Example 2 can achieve the thinning of the thickness of the lens and further substantially the same optical characteristic as that of Comparative Example 2.

Further, in the progressive power lens according to Example 2, although the shaped part which does not keep the meniscus shape due to the saddle like part 14 is arranged, since "the aspherical surface correction" is applied to the surface provided with the saddle like part 14, the amount of the reversed curve (magnitude of the surface refractive power of "negative") due to the saddle like part 14 is reduced, and an area of a region to be the reversed curve is made small. Specifically, when the surface refractive power in the horizontal direction of the lens in the lens inner surface near portion in Example 1 to which "the aspherical surface correction" is not applied (see FIG. 10) and the surface refractive power in the horizontal direction of the lens in the lens inner surface near portion in Example 2 to which "the aspherical surface correction" is applied (see FIG. 13) are compared, even if the same distance power, the same addition power ADD, or the like is set (see FIG. 7), the region of the part in which the surface refractive power is "negative" (inside the frame illustrated by the bold line in the figures) of Example 2 is narrower than that of Example 1, and the absolute value of the surface refractive power of "negative" is smaller on the whole. Namely, in the progressive power lens according to Example 2, since "the aspherical surface correction" is applied to the eyeball side surface provided with the saddle like part 14, the deterioration of the optical characteristic caused by the saddle like part 14 can be suppressed, and the thinning of thickness of the lens as a whole of the progressive power lens having the both-sides composite progressive structure can be achieved, and further, the amount of the reversed curve necessary for the thinning can be reduced and the region to be the reversed curve can be small.

Example 3

A progressive power lens according to Example 3 has, similarly to those of Examples 1, 2, the saddle like part 14 in a partial region in the near portion of the lens inner surface. However, the progressive power lens according to Example 3 is different from those of Examples 1, 2, and the astigmatism power C=−2.00 and the astigmatism axis AX=90° are prescribed (see FIG. 7) and an astigmatism correction function is given to a side of the lens inner surface provided with the saddle like part 14.

Figure 16:
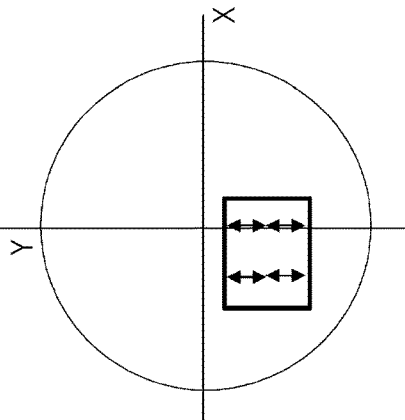
FIG. 16 is a diagram for concretely explaining the surface refractive power in the vertical direction of the lens in the lens inner surface near portion of Example 3 according to the present invention.
Figure 17:
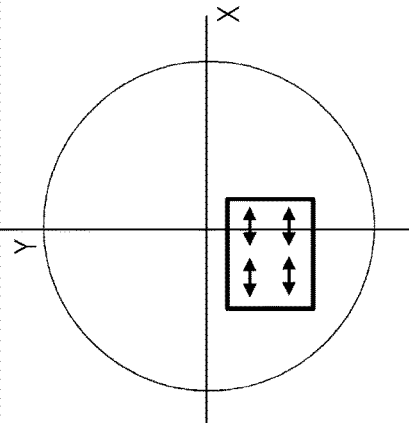
FIG. 17 is a diagram for concretely explaining the surface refractive power in the horizontal direction of the lens in the lens inner surface near portion of Example 3 according to the present invention.

FIG. 16 is a diagram for concretely explaining the surface refractive power in the vertical direction of the lens in the lens inner surface near portion according to Example 3, and FIG. 17 is a diagram for concretely explaining the surface refractive power in the horizontal direction of the lens in the lens inner surface near portion according to Example 3. Further, the example figures illustrate a specific value of the surface refractive power only in the partial region around the near power measurement point N.

As apparent from FIG. 16 and FIG. 17, in the progressive power lens according to Example 3, the surface refractive powers in both of the vertical direction of the lens and the horizontal direction of the lens are made values of "positive".

Here, in the progressive power lens according to Example 3, the astigmatism correction function is given to the side of the lens inner surface, and it is dared to adopt an example of the astigmatism axis AX of 90°. The reason is that, in a case in which the astigmatism axis AX is 90°, the component of the described astigmatism in which the surface refractive power in the horizontal direction is "positive" is added to the surface refractive power in the lens inner surface, and thereby the surface refractive power of a whole of the lens inner surface is shifted to a side of "positive", and as a result, the characteristic of the saddle like part 14 becomes latent. Thus, as the progressive power lens according to Example 3, a configuration in which the component of the prescribed astigmatism is virtually removed from the lens inner surface is described. The removal of the component of the prescribed astigmatism is preferred, for example, by means of a vector subtraction of the surface refractive power necessary for the correction for the prescribed astigmatism from each point of the surface refractive power (see FIG. 17) before the removal. Further, the vector subtraction in here may be a well-known technique and therefore, and the detailed description of the method is omitted.

Figure 18:
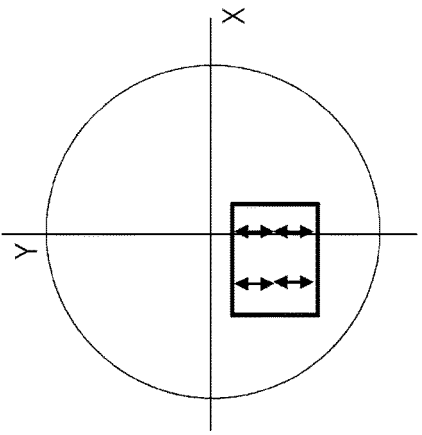
FIG. 18 is a diagram for concretely explaining the surface refractive power (after a component of prescribed astigmatism is removed) in the vertical direction of the lens in the lens inner surface near portion of Example 3 according to the present invention.
Figure 19:
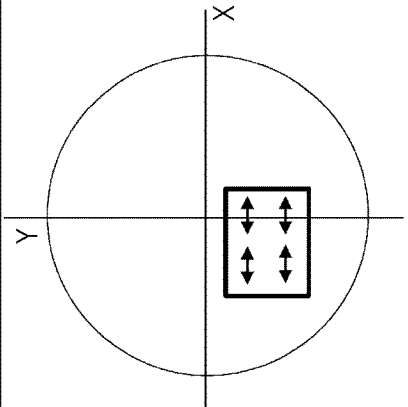
FIG. 19 is a diagram for concretely explaining the surface refractive power (after the component of prescribed astigmatism is removed) in the horizontal direction of the lens in the lens inner surface near portion of Example 3 according to the present invention.

FIG. 18 is a diagram for concretely explaining the surface refractive power (after the component of the prescribed astigmatism is removed) in the vertical direction of the lens in the lens inner surface near portion according to Example 3, and FIG. 19 is a diagram for concretely explaining the surface refractive power (after the component of the prescribed astigmatism is removed) in the horizontal direction of the lens in the lens inner surface near portion according to Example 3. Further, the example figures illustrate a specific value of the surface refractive power only in the partial region around the near power measurement point N.

As apparent from FIG. 18 and FIG. 19, in the progressive power lens according to Example 3, after the component of the prescribed astigmatism is removed, the surface refractive power is made "positive" and the meniscus shape is kept in the vertical direction of the lens, and a part in which the surface refractive power is made "negative" (inside a frame illustrated by a bold line in figure) is arranged in the partial region in the near portion in the horizontal direction of the lens. Namely, after the component of the prescribed astigmatism is removed, the shaped part formed as the saddle like part 14 is apparent in the lens inner surface.

In such a way, in the progressive power lens according to Example 3, since the saddle like part 14 which is apparent in the surface after the component of the prescribed astigmatism is removed (namely, the surface not including the component of the prescribed astigmatism) is arranged, even if the saddle like part 14 is latent in a state in which the component of the prescribed astigmatism is included, similarly to that of Example 1, the thinning of the thickness of the lens can be achieved. More specifically, also in the progressive power lens according to Example 3, similarly to that of Example 1, the saddle like part 14 is arranged in the partial region in the near portion of the lens inner surface (even if the saddle like part 14 is latent). Therefore, when compared to a configuration in which the meniscus shape is kept in the whole surface region of the lens inner surface as in Comparative Example 1, even if the same distance power, the addition power ADD, or the like is set (see FIG. 7), magnitude of the surface refractive power in the lens outer surface (namely, the depth of the lens curve) can be made relatively small (see FIG. 8). Accordingly, the progressive power lens according to Example 3 can achieve the thinning of the thickness of the lens easily compared to that of Comparative Example 1.

REFERENCE SIGNS LIST

1 progressive power lens (lens for glasses)
2 object side surface (outer surface)
3 eyeball side surface (inner surface)
11 distance portion
12 near portion
13 corridor
14 saddle like part

The invention claimed is:

1. A progressive power lens comprising:
an object side surface;
an eyeball side surface; and
at least a near portion having a power for near vision, wherein
the object side surface includes a power change in a vertical direction of the lens having a progressive refractive power function,
the eyeball side surface includes a power change in a horizontal direction of the lens having the progressive refractive power function,
when a surface refractive power in the horizontal direction of the lens is defined as DHn and a surface refractive power in the vertical direction of the lens is defined as DVn in a near power measurement point N in the object side surface, a relational expression of DHn<DVn is fulfilled, and
when the surface refracting power when a lens curve protrudes in a convex manner toward the object side surface is positive, and when the surface refractive power when the lens curve protrudes in the convex manner toward the eyeball side surface is negative, a partial region in the near portion of the eyeball side surface has a shaped part in which the signs of positive and negative of a surface refractive power in the vertical direction of the lens and a surface refractive power in the horizontal direction of the lens are opposite to each other, and the lens curve is opposite when viewed from a region other than the partial region of the near portion.

2. The progressive power lens according to claim 1, wherein
in the shaped part, the surface refractive power in the vertical direction of the lens is set to be positive and the surface refractive power in the horizontal direction of the lens is set to be negative.

3. The progressive power lens according to claim 1, wherein
when a surface refractive power in the horizontal direction is defined as DHf and a surface refractive power in the vertical direction is defined as DVf in a distance power measurement point F in the object side surface and an addition power ADD is given, relational expressions of DVn−DVf>ADD/2 and DHn−DHf<ADD/2 are fulfilled.

4. The progressive power lens according to claim 3, wherein
a relational expression of DHf+DHn<DVf+DVn is fulfilled.

5. The progressive power lens according to claim 1, wherein aspherical surface correction which corrects deterioration of an optical characteristic caused by the shaped part is applied to at least the eyeball side surface provided with the shaped part.

6. The progressive power lens according to claim 1, wherein the shaped part is apparent in a surface not including a component of prescribed astigmatism.

\* \* \* \* \*